US011165586B1

(12) United States Patent
Rule et al.

(10) Patent No.: US 11,165,586 B1
(45) Date of Patent: Nov. 2, 2021

(54) CALL CENTER WEB-BASED AUTHENTICATION USING A CONTACTLESS CARD

(71) Applicant: Capital One Services, LLC, McLean, VA (US)

(72) Inventors: Jeffrey Rule, Chevy Chase, MD (US); Rajko Ilincic, Annandale, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/085,768

(22) Filed: Oct. 30, 2020

(51) Int. Cl.
  *H04L 9/32* (2006.01)
  *G06F 16/955* (2019.01)
  (Continued)

(52) U.S. Cl.
  CPC ........ *H04L 9/3234* (2013.01); *G06F 16/9566* (2019.01); *G06K 7/10297* (2013.01);
  (Continued)

(58) Field of Classification Search
  CPC ..... H04L 9/3234; H04L 9/0877; H04L 67/02; H04L 63/0884; H04L 67/146; H04L 67/20; H04L 67/14; H04L 63/08; G06F 16/9566; G06F 21/31; G06F 21/42; G06F 7/10297; G06K 7/10297; H04M 1/724;
  (Continued)

(56) References Cited

U.S. PATENT DOCUMENTS 4,683,553 A  7/1987 Mollier
4,827,113 A  5/1989 Rikuna
    (Continued)

FOREIGN PATENT DOCUMENTS

CA    3010336 A1  7/2017
CN  101192295 A  6/2008
    (Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.
(Continued)

*Primary Examiner* — Dung B Huynh
(74) *Attorney, Agent, or Firm* — Kacvinsky Daisak Bluni PLLC

(57) ABSTRACT

Systems, methods, articles of manufacture, and computer-readable media. A server may receive a phone call and generate a uniform resource locator (URL) comprising a session identifier for an account. The server may transmit the URL to a client device. The server may receive, from a web browser, a request comprising the URL. The server may determine that the session identifier in the URL of the request matches the session identifier for the account, and transmit, to the web browser, a web page at the URL. The server may receive, from the web browser, a cryptogram read by the web page via a card reader of the client device and decrypt the cryptogram. The server may authenticate the identity of the caller for the call based on decrypting the cryptogram and the session identifier of the URL matching the session identifier of the account.

20 Claims, 20 Drawing Sheets

(51) Int. Cl.
*H04L 9/08* (2006.01)
*H04M 3/42* (2006.01)
*H04L 29/08* (2006.01)
*G06K 7/10* (2006.01)
*H04M 1/724* (2021.01)

(52) U.S. Cl.
CPC ............ *H04L 9/0877* (2013.01); *H04L 67/02* (2013.01); *H04M 1/724* (2021.01); *H04M 3/42042* (2013.01)

(58) Field of Classification Search
CPC ..... H04M 3/42042; H04M 2203/6045; H04M 2203/40; H04M 3/5183; H04M 3/51
See application file for complete search history.

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,353,852 B1* | 3/2002 | Nestoriak, III ......... H04L 29/06 379/88.17 |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,587,880 B1* | 7/2003 | Saigo ................. H04L 63/0815 709/203 |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,103,714 B1* | 9/2006 | Jacobs ................. G06F 16/9574 711/113 |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,240,192 B1* | 7/2007 | Paya ................... H04L 63/0807 713/152 |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,478,434 B1* | 1/2009 | Hinton ................. G06F 16/958 726/27 |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |

(56) References Cited

U.S. PATENT DOCUMENTS

| | | |
|---|---|---|
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,250,065 B1* | 8/2012 | Chambers ............ G06Q 10/10 707/723 |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,424,057 B2* | 4/2013 | Mardikar ............ H04L 63/0846 726/2 |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,649,768 B1* | 2/2014 | Gaddam ............ H04W 12/06 455/411 |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,856,869 B1* | 10/2014 | Brinskelle ............ G06F 21/6218 726/2 |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,164,671 B2* | 10/2015 | Hilerio ............ G06F 3/0486 |
| 9,203,800 B2 | 12/2015 | Izu et al. |
| 9,209,867 B2 | 12/2015 | Royston |
| 9,220,000 B1* | 12/2015 | Youngs ............ H04W 4/12 |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,392,075 B1* | 7/2016 | Radovnikovic .... H04N 21/8586 |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,578,500 B1* | 2/2017 | Yeduvakula ........ H04W 12/065 |
| 9,619,952 B1 | 4/2017 | Zhao et al. |
| 9,635,000 B1 | 4/2017 | Muftic |
| 9,665,858 B1 | 5/2017 | Kumar |
| 9,674,344 B1* | 6/2017 | Varman ............ H04M 3/5235 |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,842,329 B2* | 12/2017 | Bengtsson ........ H04W 12/0609 |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,298,759 B1* | 5/2019 | Ross ............ H04M 3/5183 |
| 10,438,437 B1* | 10/2019 | Herrington ........ G06Q 20/3278 |
| 10,440,014 B1* | 10/2019 | Hoyer ............ H04L 63/0853 |
| 10,523,708 B1* | 12/2019 | Ilincic ............ H04L 9/3234 |
| 10,528,976 B1* | 1/2020 | Fries ............ H04L 67/04 |
| 10,860,703 B1* | 12/2020 | Manwiller ........ H04L 63/0876 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0048269 A1* | 4/2002 | Hong ............ H04L 61/2015 370/389 |
| 2002/0073152 A1* | 6/2002 | Andrew ............ G06Q 30/02 709/204 |
| 2002/0078345 A1 | 6/2002 | Sandhu et al. |
| 2002/0087289 A1* | 7/2002 | Halabieh ............ G06F 9/451 702/181 |

(56) References Cited

U.S. PATENT DOCUMENTS

| | | |
|---|---|---|
| 2002/0093530 A1 | 7/2002 | Krothapalli et al. |
| 2002/0099936 A1* | 7/2002 | Kou .................. H04L 69/329 713/151 |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0061520 A1* | 3/2003 | Zellers .................. H04L 63/083 726/5 |
| 2003/0078882 A1 | 4/2003 | Sukeda et al. |
| 2003/0084171 A1* | 5/2003 | de Jong .................. H04L 67/34 709/229 |
| 2003/0097564 A1* | 5/2003 | Tewari .............. H04L 29/12113 713/171 |
| 2003/0101136 A1* | 5/2003 | Wheeler .............. G06Q 20/341 705/42 |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039827 A1* | 2/2004 | Thomas .............. H04L 67/2804 709/228 |
| 2004/0039919 A1 | 2/2004 | Takayama et al. |
| 2004/0054628 A1* | 3/2004 | de Jong .............. H04L 29/06027 705/51 |
| 2004/0117486 A1* | 6/2004 | Bourne .............. H04L 67/2842 709/228 |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0033702 A1* | 2/2005 | Holdsworth ......... G06Q 20/108 705/67 |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0124288 A1* | 6/2005 | Karmi .................. H04W 12/06 455/3.01 |
| 2005/0138387 A1 | 6/2005 | Lam et al. |
| 2005/0154887 A1* | 7/2005 | Birk ........................ G06F 21/41 713/168 |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0198332 A1* | 9/2005 | Laertz .................. H04L 63/0281 709/229 |
| 2005/0247797 A1 | 11/2005 | Ramachandran |
| 2005/0250548 A1* | 11/2005 | White .................. H04N 1/00204 455/566 |
| 2005/0268100 A1* | 12/2005 | Gasparini .............. H04L 63/168 713/170 |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0056415 A1* | 3/2006 | Lee ........................ H04L 12/14 370/392 |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0136279 A1* | 6/2007 | Zhou .................. G06F 16/9566 |
| 2007/0150603 A1* | 6/2007 | Crull ........................ H04L 63/08 709/227 |
| 2007/0197261 A1 | 8/2007 | Humbel |
| 2007/0224969 A1 | 9/2007 | Rao |
| 2007/0241182 A1 | 10/2007 | Buer |
| 2007/0245027 A1* | 10/2007 | Ghosh .............. H04L 29/12594 709/228 |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0059797 A1* | 3/2008 | Tokuno .................. H04L 9/3273 713/171 |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0212771 A1* | 9/2008 | Hauser .................. H04L 63/0853 380/44 |
| 2008/0223918 A1 | 9/2008 | Williams et al. |
| 2008/0270571 A1* | 10/2008 | Walker .................. G06F 21/6209 709/218 |
| 2008/0285746 A1 | 11/2008 | Landrock et al. |
| 2008/0301433 A1* | 12/2008 | Vito .................. H04L 9/0844 713/153 |
| 2008/0308641 A1 | 12/2008 | Finn |
| 2009/0013393 A1* | 1/2009 | Xi .......................... H04L 9/3263 726/7 |
| 2009/0037275 A1 | 2/2009 | Pollio |
| 2009/0048026 A1 | 2/2009 | French |
| 2009/0065571 A1* | 3/2009 | Jain .................. H04M 1/72575 235/379 |
| 2009/0132417 A1 | 5/2009 | Scipioni et al. |
| 2009/0143104 A1 | 6/2009 | Loh et al. |
| 2009/0150485 A1* | 6/2009 | Kawabata .............. H04L 67/28 709/203 |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0161714 A1* | 6/2010 | Dongre .................. H04L 67/02 709/203 |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2010/0327054 A1* | 12/2010 | Hammad .................. G06Q 20/12 235/375 |
| 2011/0028160 A1 | 2/2011 | Roeding et al. |
| 2011/0035604 A1 | 2/2011 | Habraken |
| 2011/0047045 A1* | 2/2011 | Brody .................. G06Q 30/0613 705/26.41 |

(56) References Cited

U.S. PATENT DOCUMENTS

| | | |
|---|---|---|
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2011/0314114 A1* | 12/2011 | Young, III ............. G06Q 30/02 709/206 |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0066504 A1* | 3/2012 | Hird ..................... G06F 21/31 713/183 |
| 2012/0072979 A1* | 3/2012 | Cha .................... H04L 63/0815 726/7 |
| 2012/0079281 A1 | 3/2012 | Lowenstein et al. |
| 2012/0084561 A1* | 4/2012 | Soulios ................ H04L 9/3213 713/168 |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0166803 A1* | 6/2012 | Hu ........................ H04L 63/10 713/171 |
| 2012/0174196 A1* | 7/2012 | Bhogavilli .......... H04L 63/1416 726/5 |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0221859 A1* | 8/2012 | Marien ............... H04L 63/0853 713/172 |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0272160 A1* | 10/2012 | Spivack ................ H04L 51/32 715/752 |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Caiman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0276078 A1* | 10/2013 | Rockwell ............ H04L 63/0846 726/7 |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0020073 A1* | 1/2014 | Ronda ..................... G06F 21/44 726/7 |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0040628 A1* | 2/2014 | Fort ....................... G09C 5/00 713/182 |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0164771 A1* | 6/2014 | Danree ............... H04W 12/0802 713/170 |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279094 A1* | 9/2014 | Neighman ........... G06Q 20/4012 705/16 |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0372250 A1* | 12/2014 | Dugan ............... G06Q 30/0269 705/26.7 |
| 2014/0379361 A1 | 12/2014 | Mahadkar et al. |
| 2015/0012444 A1 | 1/2015 | Brown et al. |
| 2015/0019442 A1* | 1/2015 | Hird ................. H04W 12/04031 705/71 |
| 2015/0032635 A1 | 1/2015 | Guise |
| 2015/0039694 A1* | 2/2015 | Yoon .................... H04L 12/1813 709/204 |
| 2015/0046339 A1* | 2/2015 | Wong ................. G06Q 20/3829 705/71 |
| 2015/0071486 A1 | 3/2015 | Rhoads et al. |
| 2015/0081461 A1* | 3/2015 | Adrangi ................ G07G 1/0081 705/17 |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0156328 A1* | 6/2015 | Arslan .................... G06F 21/42 379/88.02 |

(56) References Cited

U.S. PATENT DOCUMENTS

| | | |
|---|---|---|
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0244698 A1* | 8/2015 | Zheng .................. H04L 9/3226 726/7 |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0021091 A1* | 1/2016 | Hoyer ..................... H04L 9/321 726/9 |
| 2016/0026997 A1* | 1/2016 | Tsui ................. G06Q 20/40145 705/75 |
| 2016/0048913 A1 | 2/2016 | Rausaria et al. |
| 2016/0055480 A1 | 2/2016 | Shah |
| 2016/0057619 A1 | 2/2016 | Lopez |
| 2016/0063496 A1* | 3/2016 | Royyuru ............... H04L 9/3226 705/71 |
| 2016/0065370 A1* | 3/2016 | Le Saint .................. H04L 9/14 713/155 |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0180333 A1* | 6/2016 | Leyva ................... G06Q 20/363 705/41 |
| 2016/0191699 A1* | 6/2016 | Agrawal ............ G06Q 30/0246 705/14.45 |
| 2016/0232523 A1 | 8/2016 | Venot et al. |
| 2016/0239672 A1 | 8/2016 | Khan et al. |
| 2016/0241402 A1* | 8/2016 | Gordon ................. H04L 9/3228 |
| 2016/0253651 A1 | 9/2016 | Park et al. |
| 2016/0255072 A1 | 9/2016 | Liu |
| 2016/0260078 A1* | 9/2016 | Phillips ............ G06Q 20/38215 |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0285848 A1* | 9/2016 | Minami ............... H04L 63/0853 |
| 2016/0301683 A1* | 10/2016 | Laxminarayanan .......................... H04L 63/0823 |
| 2016/0307186 A1* | 10/2016 | Noe ...................... G06Q 20/352 |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0012837 A1* | 1/2017 | Zaidi ....................... G06Q 40/02 |
| 2017/0017957 A1* | 1/2017 | Radu .................. G06Q 20/3823 |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0085563 A1* | 3/2017 | Royyuru .............. G06Q 20/3223 |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0154366 A1* | 6/2017 | Turgeman ............. G06Q 30/0277 |
| 2017/0180134 A1 | 6/2017 | King |
| 2017/0213218 A1* | 7/2017 | Pickering ............. G06Q 20/341 |
| 2017/0230189 A1 | 8/2017 | Toll et al. |
| 2017/0237301 A1 | 8/2017 | Elad et al. |
| 2017/0272253 A1* | 9/2017 | Lavender .............. H04L 9/3247 |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0373852 A1* | 12/2017 | Cassin .................. H04L 63/062 |
| 2017/0374070 A1 | 12/2017 | Shah et al. |
| 2018/0026973 A1* | 1/2018 | Le Saint ........... H04W 12/0608 713/168 |
| 2018/0034507 A1 | 2/2018 | Wobak et al. |
| 2018/0039986 A1 | 2/2018 | Essebag et al. |
| 2018/0041339 A1* | 2/2018 | Lee ........................ G06F 21/42 |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0167208 A1* | 6/2018 | Le Saint .................. H04L 9/14 |
| 2018/0183737 A1* | 6/2018 | Subbarayan ........ G06Q 20/3223 |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0240110 A1* | 8/2018 | Smets ............... H04W 12/0602 |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0055835 A1* | 2/2019 | Brookes ................. H04Q 9/02 |
| 2019/0228178 A1* | 7/2019 | Sharma .............. G06Q 20/3276 |
| 2019/0238517 A1 | 8/2019 | D'Agostino et al. |
| 2019/0303915 A1* | 10/2019 | Hammad ................ G06F 21/34 |
| 2019/0347661 A1* | 11/2019 | Grenader ............ G06Q 20/401 |
| 2019/0363885 A1* | 11/2019 | Schiavoni ........... H04L 63/0807 |
| 2020/0250666 A1* | 8/2020 | Carri ..................... H04L 9/3213 |
| 2020/0322320 A1* | 10/2020 | Moon ..................... H04L 51/04 |
| 2020/0382311 A1* | 12/2020 | Bueno ................. H04L 63/1483 |
| 2020/0412715 A1* | 12/2020 | Chen ................... H04L 63/0861 |
| 2021/0012333 A1* | 1/2021 | Mutha ................. H04L 63/0421 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |

(56) References Cited

FOREIGN PATENT DOCUMENTS

| | | | |
|---|---|---|---|
| WO | 2017042375 A1 | 3/2017 | |
| WO | 2017042400 A1 | 3/2017 | |
| WO | 2017157859 A1 | 9/2017 | |
| WO | 2017208063 A1 | 12/2017 | |
| WO | 2018063809 A1 | 4/2018 | |
| WO | 2018137888 A1 | 8/2018 | |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-infomnation-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019], Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved an Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD2_encodi ..., 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019], Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.PIatform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019], Retrieved from Internet URL: https://www.bankrate.com/banking/banking-app-location-sharing/, 6 pages.

(56) References Cited

OTHER PUBLICATIONS

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition ", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

\* cited by examiner

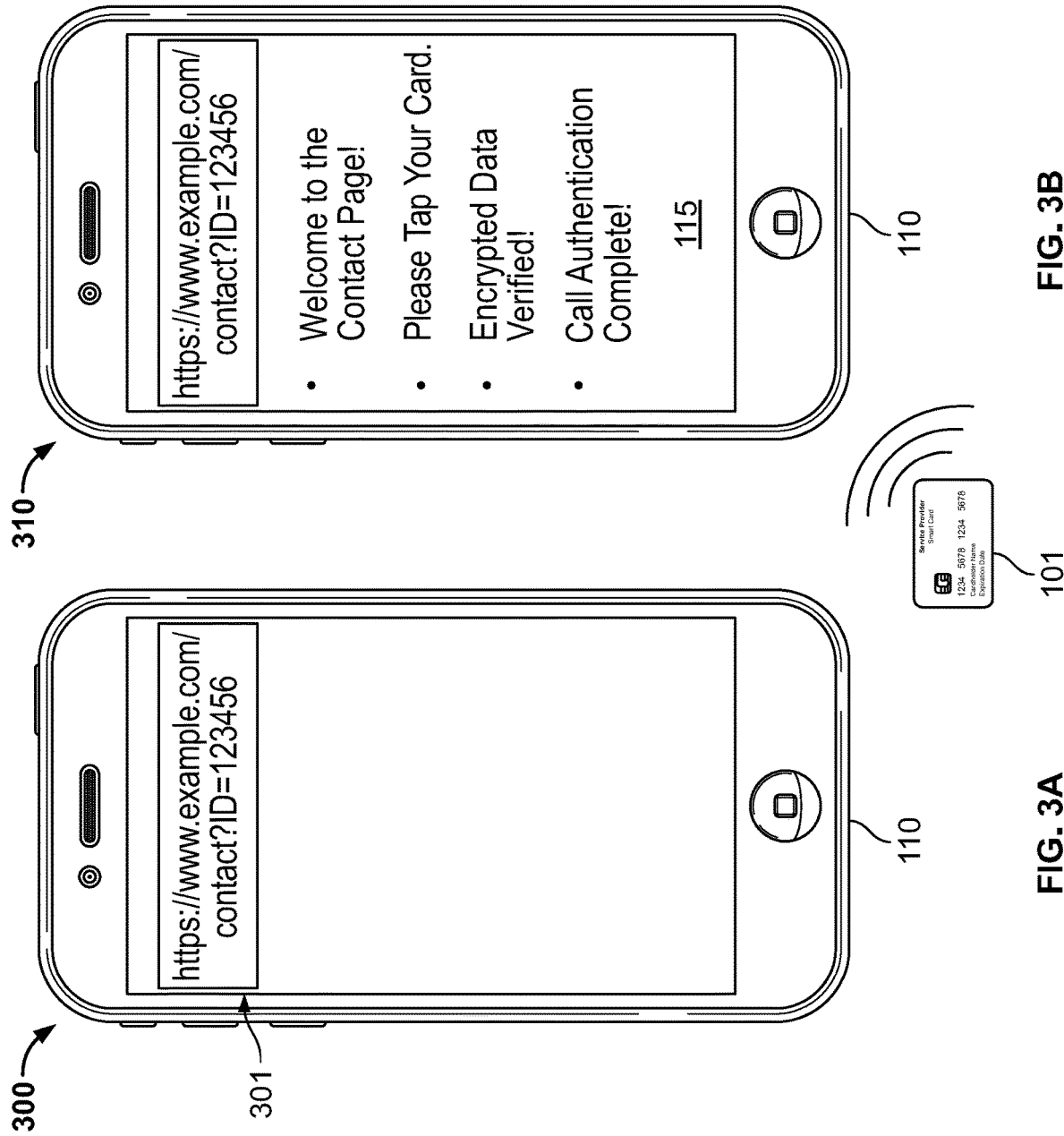

US 11,165,586 B1

CALL CENTER WEB-BASED AUTHENTICATION USING A CONTACTLESS CARD

TECHNICAL FIELD

Embodiments disclosed herein generally relate to call center platforms, and more specifically, to secure, web-based authentication for call center calls using a contactless card.

BACKGROUND

Often, people make telephone calls to call centers provided by different entities, such as government agencies, businesses, educational institutions, and the like. For security reasons, authenticating the caller's identity is a prerequisite to providing customer service via call centers. Some conventional solutions may leverage dedicated applications to facilitate the authentication. However, some users may not have such dedicated applications installed on their computing device when making the call.

SUMMARY

Embodiments disclosed herein provide systems, methods, articles of manufacture, and computer-readable media for secure web-based authentication for call center calls using a contactless card. In one example, a server may receive a phone call from a client device. The server may generate a uniform resource locator (URL) comprising a session identifier as a parameter and associate the session identifier with an account. The server may transmit the URL to the client device. The server may receive, from a web browser of the client device, a request comprising the URL. The server may determine that the session identifier of the URL of the request matches the session identifier associated with the account, and transmit, to the web browser, a web page associated with the URL. The server may receive, from the web page in the web browser, a cryptogram read by the web page via a card reader of the client device and decrypt the cryptogram. The server may authenticate the account for the phone call, based on the decryption of the cryptogram and the session identifier of the URL matching the session identifier associated with the account. The server may, based on the authentication of the account, provide one or more attributes of the account to a graphical user interface displayed on a call center agent system assigned to the phone call.

BRIEF DESCRIPTION OF THE DRAWINGS

FIGS. 3A-3B illustrate embodiments of a system.

DETAILED DESCRIPTION

Figure 1A:
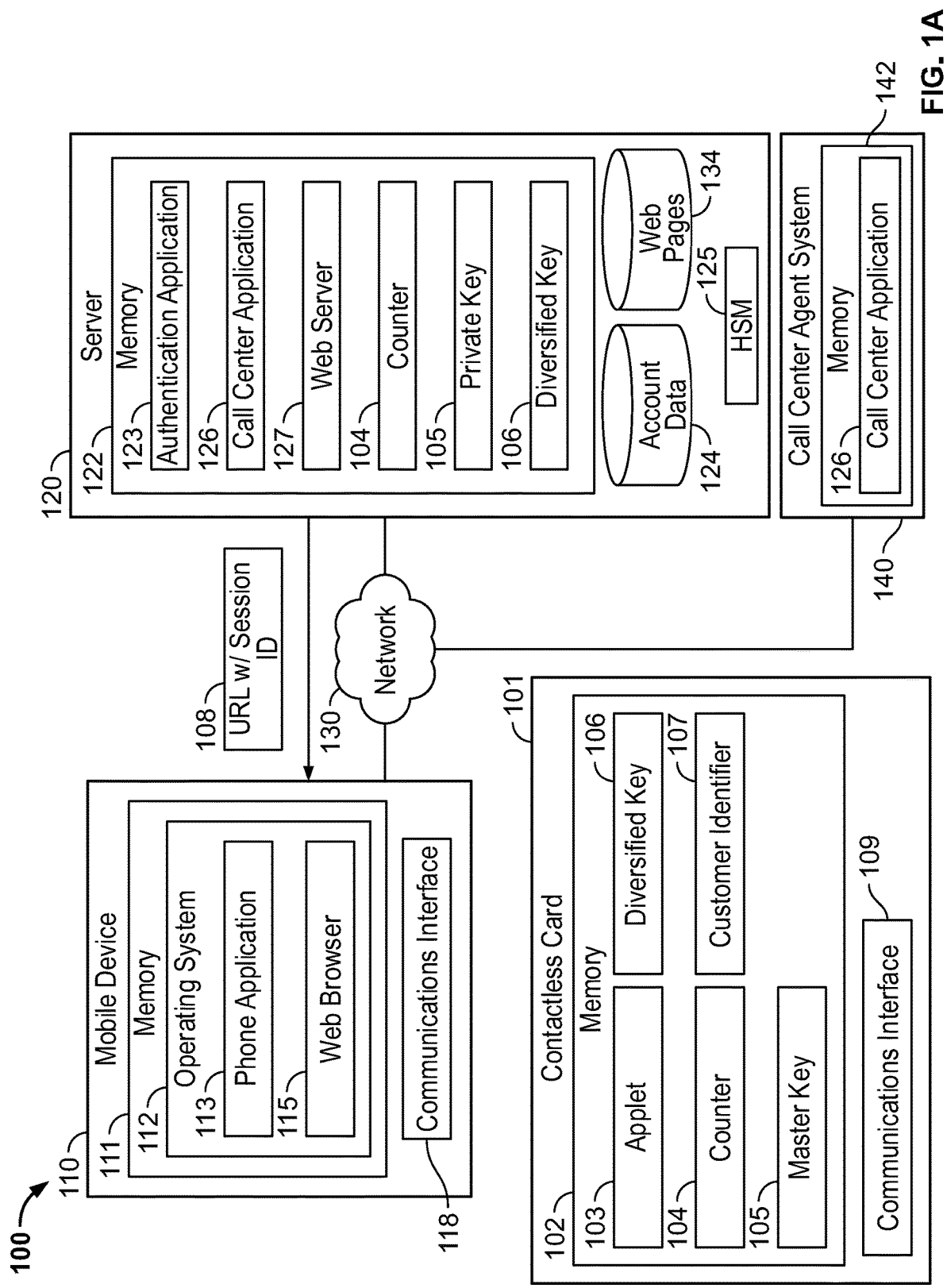
FIGS. 1A-1D illustrate embodiments of a system.

Embodiments disclosed herein provide techniques for secure authentication of identity using a contactless card and a computing device that does not have a dedicated application installed. For example, a bank or other financial institution may provide a call center system. Often, the bank may provide a dedicated application that may be used to access relevant account features. However, the user may not have such an application installed on any of their computing devices. Advantageously, however, embodiments disclosed herein may leverage a web browser to securely read data from a contactless card via near-field communications (NFC). As described in greater detail herein, the data read via NFC may be used to verify (or authenticate) the identity of a caller to a call center platform.

In one embodiment, a user may place a call to the call center. A call center system may generate a session identifier (ID) for the call. The call center system may associate the session ID with the account the caller indicates is the subject of the phone call (e.g., by storing the session ID in an account database record for the account). The call center system may then generate a uniform resource locator (URL) that includes the session ID as a parameter. The URL may generally be directed to one or more web pages associated with the call center. The call center system may then transmit the URL to a known device associated with the account, e.g., via a short message service (SMS) message, text message, email, system notification, etc.

Once received, a user may select the URL on the device, which causes the device to open a web browser that requests the resource at the specified URL. A web server associated with the call center system may receive the request from the web browser and identify the session ID. The web server may determine that the session ID specified in the URL matches the stored session ID generated for the account. If the session IDs match, the web server may transmit a web page associated with the URL to the web browser of the device. Once rendered in the web browser, the web page may include functionality for communicating with a contactless card, e.g., via NFC. The web page may instruct the user to tap the contactless card to the device. In response, the user may tap the contactless card to the device, and the web page and/or web browser may instruct the contactless card to generate a cryptogram, which may be included as part of an NFC Forum Data Exchange Format (NDEF) file. The web page and/or web browser may read the cryptogram and transmit the cryptogram to the server for decryption. The server may attempt to decrypt the cryptogram. If the server is able to decrypt the cryptogram and the session IDs match, the authentication of the caller may be completed. In such an example, one or more attributes of the account may be outputted on a graphical user interface (GUI) of a call center terminal (e.g., a system used by a call center agent who is speaking with the caller).

In another embodiment, the user may access a web page using the web browser on a computing device. The web page rendered in the web browser may instruct the user to tap the contactless card to the computing device. The web page and/or web browser may communicate with the contactless card to cause the contactless card to generate a cryptogram. The web page and/or web browser may read the cryptogram and transmit the cryptogram to the server for decryption. If the server is able to decrypt the cryptogram, the web server may determine whether one or more relevant cookies are saved by the web browser of the computing device. For example, a cookie may store a hash value associated with the user account. If the cookie is present and stores a hash value matching the hash value stored in the account database for the user account, the user's identity may be authenticated. If the hash values match, the web server and/or call center server may generate a session ID for the call. The session ID may be appended to a pre-authenticated phone number, e.g., following one or more special characters such as the hash "#" character. The web server may transmit the phone number including the session ID to the web browser of the computing device. Once selected, the computing device may initiate a phone call to the received number. Once the call is answered by the call center system, the computing device may automatically enter the session ID, thereby providing the session ID to the call center system. If the session ID entered by the computing device matches the session ID, the call may be authenticated and directly connected to a representative without requiring further authentication. The call center terminal used by the representative may automatically display the relevant account details in the GUI.

Advantageously, embodiments disclosed herein provide techniques to securely authenticate caller identities for call center calls. By leveraging cryptograms generated by contactless cards, embodiments of the disclosure may securely verify the identity of the caller with minimal risk of fraudulent activity. Furthermore, by using a web browser, a dedicated client application is not required to authenticate the caller and/or engage in data communications with the contactless card. Using a web browser may advantageously scale the functionality described herein to different entities and any number of users without requiring a dedicated application. Furthermore, by providing a simplified authentication process, more user calls may be handled by the call center system, thereby improving system performance.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts an exemplary system 100, consistent with disclosed embodiments. Although the system 100 shown in FIGS. 1A-1D has a limited number of elements in a certain topology, it may be appreciated that the system 100 may include more or less elements in alternate topologies as desired for a given implementation.

As shown, the system 100 comprises one or more contactless cards 101, one or more computing devices 110, one or more call center agent systems 140, and one or more servers 120. The contactless card 101 is representative of any type of payment card, such as a credit card, debit card, ATM card, gift card, and the like. The contactless card 101 may comprise one or more communications interfaces 109, such as a radio frequency identification (RFID) chip, configured to communicate with a communications interface 118 of the computing devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi.

The computing device 110 and the call center agent systems 140 are representative of any number and type of computing device, such as smartphones, tablet computers, wearable devices, laptops, portable gaming devices, virtualized computing system, merchant terminals, point-of-sale systems, servers, desktop computers, and the like. The server 120 is representative of any type of computing device, such as a server, workstation, compute cluster, cloud computing platform, virtualized computing system, and the like. Although not depicted for the sake of clarity, the computing device 110, contactless card 101, server 120, and agent system 140 each include one or more processor circuits to execute programs, code, and/or instructions.

As shown, a memory 102 of the contactless card 101 includes an applet 103, a counter 104, a master key 105, a diversified key 106, and a unique customer identifier (ID) 107. The applet 103 is executable code configured to perform the operations described herein. The counter 104, master key 105, diversified key 106, and customer ID 107 are used to provide security in the system 100 as described in greater detail below.

As shown, a memory 111 of the computing device 110 includes an operating system (OS) 112, a phone application 113, and a web browser 115. Example operating systems 112 include the Android® OS, iOS®, macOS®, Linux®, and Windows® operating systems. The phone application 113 (also referred to as a "dialer" application) is an application that allows the device 110 to place and/or receive telephone calls. For example, in embodiments where the computing device 110 is a smartphone, the phone application 113 allows the user to make and/or receive telephone calls via a cellular network (not pictured) and/or via the network 130 (e.g., via the Internet). The web browser 115 is an application that allows the device 110 to access information via the network 130 (e.g., via the Internet).

As shown, a memory 122 of the server 120 includes an authentication application 123, a call center application 126, and a web server 127. Although depicted as separate components of the server 120, in some embodiments, the authentication application 123, call center application 126, and/or the web server 127 may be integrated into a single component, e.g., a single application including all associated functionality described herein. Similarly, although depicted as part of the server 120, in some embodiments, the authentication application 123, call center application 126, and/or the web server 127 may be implemented in separate servers. Furthermore, the authentication application 123, call center application 126, and/or the web server 127 may be implemented in hardware, software, and/or a combination of hardware and software. Further still, the instances of the call center application 126 of the server 120 and/or the agent system 140 are generally configured to perform all disclosed operations related to the call center application 126.

As described in greater detail herein, the authentication application 123 is configured to facilitate authentication for calls to the call center application 126 based on encrypted data generated by the contactless card 101. The web server 127 is generally configured to process client requests for web pages 134 from the web browsers 115. In at least one embodiment, the web server 127 and the browsers 115 communicate via the hypertext transfer protocol (HTTP).

The call center application 126 generally provides functionality for a call center system whereby a plurality of phone calls may be answered, routed, forwarded, and/or otherwise processed. For example, a caller may dial one of a plurality of phone numbers associated with the call center application 126. The call center application 126 of the server 120 may answer the call, optionally receive input from the user, and/or route the call to one of a plurality of call center agent systems 140 for handling by an agent. In some embodiments, the call center application 126 provides a virtual call center such that the agent systems 140 may be geographically diverse, e.g., not in a centralized location. Each call center agent system 140 includes an instance of the call center application 126 that interfaces with the call center application 126 of the server 120, e.g., to accept and/or manage telephone calls received from customers routed to the agent systems 140 by the server 120. More generally, the call center application 126 may include one or more GUIs to display attributes of a call, a caller, an account, and/or any other relevant information as described herein.

Continuing with the previous example, the call center application 126 of the server 120 may route the caller's call to a first agent system 140. To assist the customer, the agent may need to access one or more account details for the customer in the account data 124. However, to preserve the security of the account data 124, the system 100 must authenticate the identity of the caller and/or the call. In the embodiment depicted in FIG. 1A, the call center application 126 of the server 120 may generate a session ID for the call and associate the session ID with the account in a record in the account data 124. The session ID may be any unique alphanumeric identifier of any suitable length, such as a hash value 32 characters in length. The call center application 126 of the server 120 may further assign a time limit, or duration, to the session ID, such as 45 seconds, 2 minutes, 10 minutes, etc. The call center application 126 of the server 120 may further associate the session ID with an identifier for the agent assigned to the call, such as unique agent identifier, an identifier of the device 140 used by the agent assigned to the call, and/or an identifier of the instance of the call center application 126 used by the agent assigned to the call. The call center application 126 of the server 120 may then generate a URL 108 that includes the session ID as a parameter. The URL 108 (and any other URL disclosed herein) may be directed to any component of the server 120 and/or any resource associated with the server 120. For example, if the session ID is "ABC123", the URL with session ID 108 may be "http://www.example.com/webauth.html?ABC123". In such an example, the "http://www.example.com/webauth.html" portion of the URL may generally be directed to the server 120, one or more web pages 134 managed by the web server 127, any component of the server 120, and/or any resource associated with the server 120.

Generally, the web pages 134 may include hypertext markup language (HTML) pages, JavaScript® pages, and/or any other type of page that can be rendered by a web browser 115. In some embodiments, the web pages 134 and/or URL 108 may be directed to the call center application 126 and/or authentication application 123. In some embodiments, the web pages 134 may provide access to functionality provided by the call center application 126 and/or authentication application 123. Furthermore, in some embodiments, the web pages 134 may be directed to web-based front-ends exposed by the call center application 126 and/or authentication application 123.

In one embodiment, the call center application 126 of the server 120 generates the session ID and the URL 108 responsive to input received from the agent via the call center application 126 on the agent system 140. The input may include an indication of the account number the customer has requested to access. In some embodiments, the call center application 126 may programmatically generate the URL 108 and/or session ID based on determining that the phone number from which a call is received is stored in the account data 124 as being associated with an account.

If the received phone call is from the number associated with the account in the account data 124, the call center application 126 of the server 120 may then transmit the URL with session ID 108 to a device associated with the subject account in the account data 124. For example, the call center application 126 of the server 120 may identify a mobile phone number associated with the account in the account data 124 and send an SMS message to the specified mobile phone number. In another example, the call center application 126 of the server 120 may include the URL with session ID 108 in an email sent to a known email address of the customer. Generally, the URL with session ID 108 may be transmitted via any suitable technique. In some embodiments, the phone call may be received from a first number associated with the account and the URL with session ID 108 may be transmitted to a second phone number associated with the account. Embodiments are not limited in this context.

Figure 1B:
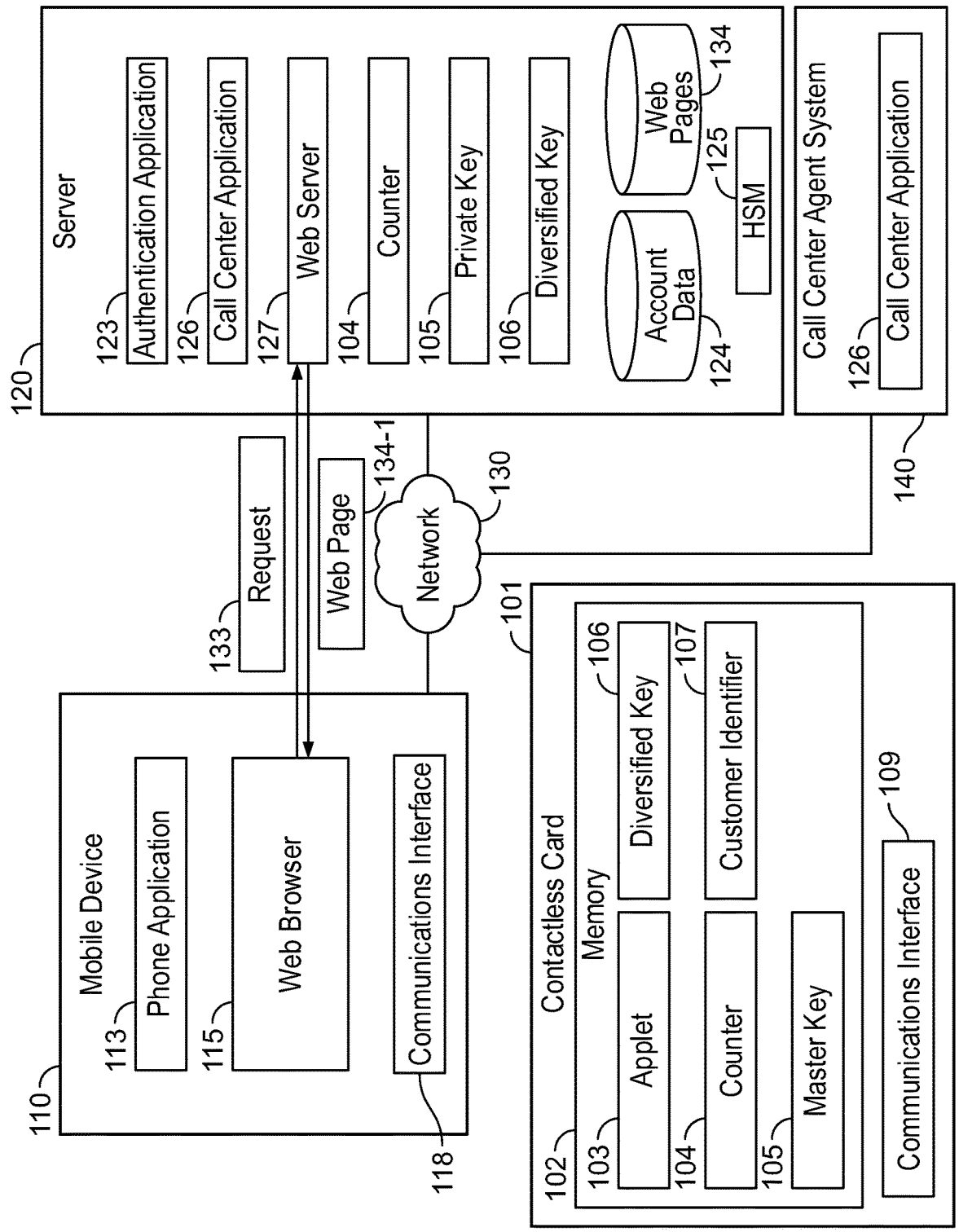

FIG. 1B depicts an embodiment where the device 110 receives the URL with session ID 108 from the server 120. The user may select the URL 108, which causes the web browser 115 to generate an HTTP request 133 that specifies the URL 108. The web server 127 may receive and process the request 133. In at least one embodiment, the web server 127 may extract the session ID from the URL 108 and compare the session ID to the session ID stored in the account data 124. If a match does not exist, the authentication may fail, and the web server 127 may return an indication of the failed authentication to the devices 110, 140. Similarly, the web server 127 may determine whether the time limit has elapsed for the session ID. For example, if the time limit is 10 minutes, and the request 133 is received 15 minutes after the session ID is created, the time limit is exceeded, and the authentication fails. Otherwise, if a match exists and the time limit is not exceeded, the web server 127 may send a response that includes a web page 134-1. Furthermore, if the match exists and the time limit is not exceeded, the web server 127 and/or call center application 126 may provide a corresponding indication to the call center application 126 of the agent device 140.

Figure 1C:
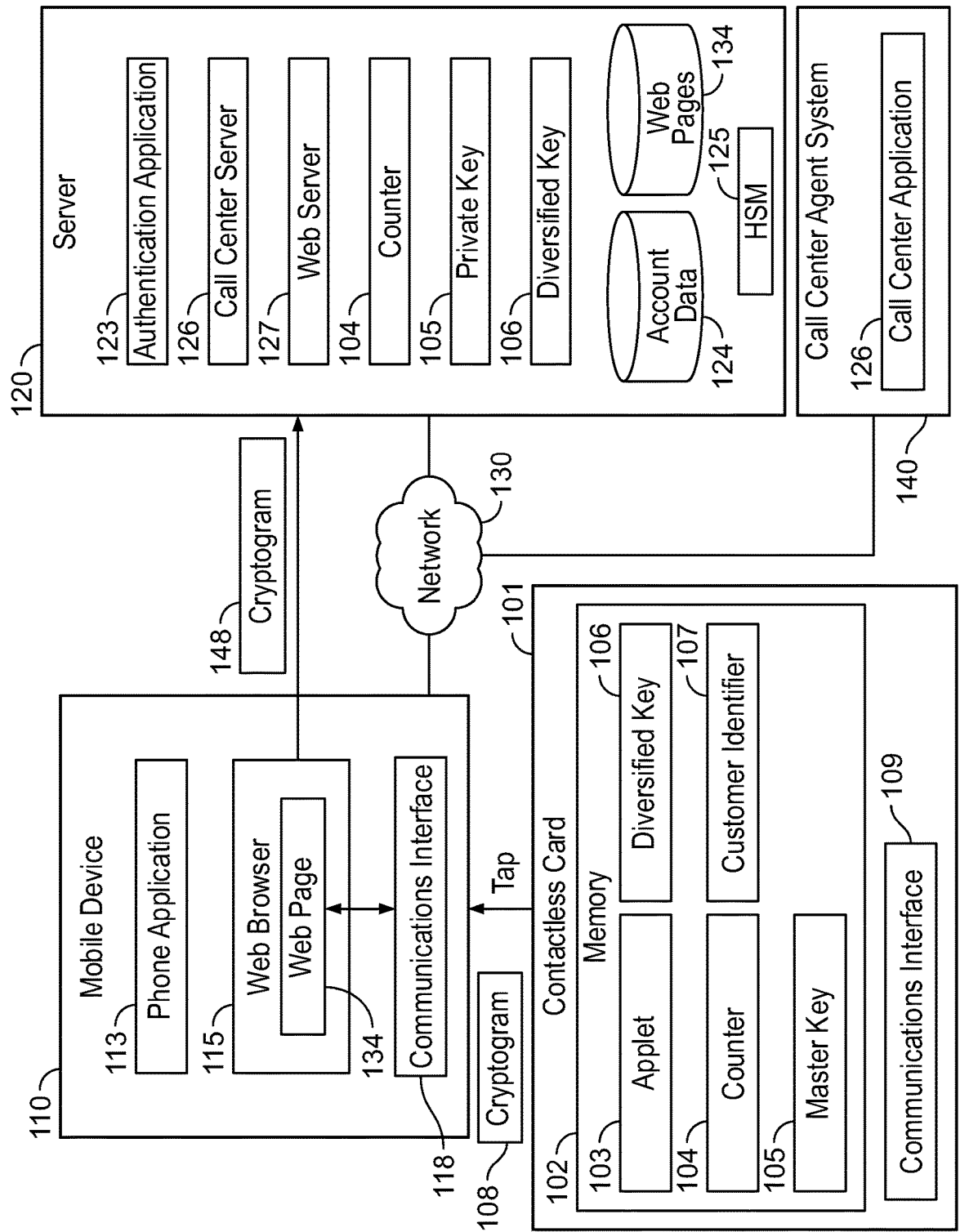

FIG. 1C depicts an embodiment where the web browser 115 has loaded the web page 134-1. Advantageously, the web page 134-1 includes functionality to wirelessly read data generated by the contactless card 101 and/or wirelessly write data to the memory 102 of the contactless card 101. More generally, a given web page 134 and/or the web browser 115 may include functionality control the communications interface 118 and communicate with the card 101 without requiring a dedicated operating system application (e.g., an application store application) to perform these functions. In at least one embodiment, the functionality is provided via one or more application programming interfaces (APIs). The APIs may be defined by the Web NFC Draft Community Group Report. Therefore, the web page 134-1 (and any other web pages 134) may control the NFC capabilities of the communications interface 118 without requiring a dedicated application.

In some embodiments, the web page 134-1 in the web browser 115 may output an indication requesting or instructing the user to tap the contactless card 101 to the device 110 to authenticate the account for the phone call. Generally, once the contactless card 101 is brought within communications range of the communications interface 118 of the device 110, the applet 103 of the contactless card 101 may generate a cryptogram 148. The cryptogram 148 may be based on the customer ID 107 of the contactless card 101. The cryptogram 148 may be generated based on any suitable cryptographic technique. In at least one embodiment, the cryptogram 148 is included in an NDEF file. The NDEF file may indicate that the cryptogram 148 was read from the contactless card 101 via the card reader 118 of the device 110.

As stated, the system 100 is configured to implement key diversification to secure data, which may be referred to as a key diversification technique herein. Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location, such as the hardware security module (HSM) 125). The master key 105 may be kept secret from all parties other than the contactless card 101 and server 120, thereby enhancing security of the system 100. In some embodiments, the applet 103 of the contactless card 101 may encrypt and/or decrypt data (e.g., the customer ID 107) using the master key 105 and the data as input a cryptographic algorithm. For example, encrypting the customer ID 107 with the master key 105 may result in the encrypted customer ID included in the cryptogram 148. Similarly, the server 120 may encrypt and/or decrypt data associated with the contactless card 101 using the corresponding master key 105.

In other embodiments, the master keys 105 of the contactless card 101 and server 120 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the device 110). When preparing to send data (e.g., to the server 120 and/or the device 110), the contactless card 101 may increment the counter value 104. The contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the contactless card 101 may then encrypt the data (e.g., the customer ID 107 and/or any other data) using the diversified key 106 and the data as input to the cryptographic algorithm. For example, encrypting the customer ID 107 with the diversified key 106 may result in the encrypted customer ID included in the cryptogram 148. The web browser 115 and/or the web page 134 may then read the cryptogram 148 via the communications interface 118.

Regardless of the encryption technique used, the web page 134 and/or web browser 115 may then transmit the cryptogram 148 to the server 120 via the network 130. The web page and/or web browser 115 may further indicate, to the server 120, that the cryptogram 148 was read from the contactless card 101 via the card reader 118 of the device 110. Once received, the authentication application 123 may attempt to authenticate the cryptogram 148. For example, the authentication application 123 may attempt to decrypt the cryptogram 148 using a copy of the master key 105 stored by the server 120. In another example, the authentication application 123 may provide the master key 105 and counter value 104 as input to the cryptographic algorithm, which produces a diversified key 106 as output. The resulting diversified key 106 may correspond to the diversified key 106 of the contactless card 101, which may be used to decrypt the cryptogram 148.

Regardless of the decryption technique used, the authentication application 123 may successfully decrypt the cryptogram 148, thereby verifying or authenticating the cryptogram 148 (e.g., by comparing the resulting customer ID 107 to a customer ID stored in the account data 124, and/or based on an indication that the decryption using the key 105 and/or 106 was successful). Although the keys 105, 106 are depicted as being stored in the memory 122, the keys 105, 106 may be stored elsewhere, such as in a secure element and/or the HSM 125. In such embodiments, the secure element and/or the HSM 125 may decrypt the cryptogram 148 using the keys 105 and/or 106 and a cryptographic function. Similarly, the secure element and/or HSM 125 may generate the diversified key 106 based on the master key 105 and counter value 104 as described above. If the decryption is successful and the session ID of the URL 108 matches the session ID stored in the account data 124, the phone call may be authenticated.

If, however, the authentication application 123 is unable to decrypt the cryptogram 148 to yield the expected result (e.g., the customer ID 107 of the account associated with the contactless card 101), the authentication application 123 does not validate the cryptogram 148. In such an example, the authentication application 123 transmits an indication of the failed authentication to the web browser 115, the call center application 126 of the server 120, and/or the call center application 126 of the agent system 140. The call center application 126 and/or call center application 126 may then restrict access to the client data from the account data 124 to preserve the security of the account.

Figure 1D:
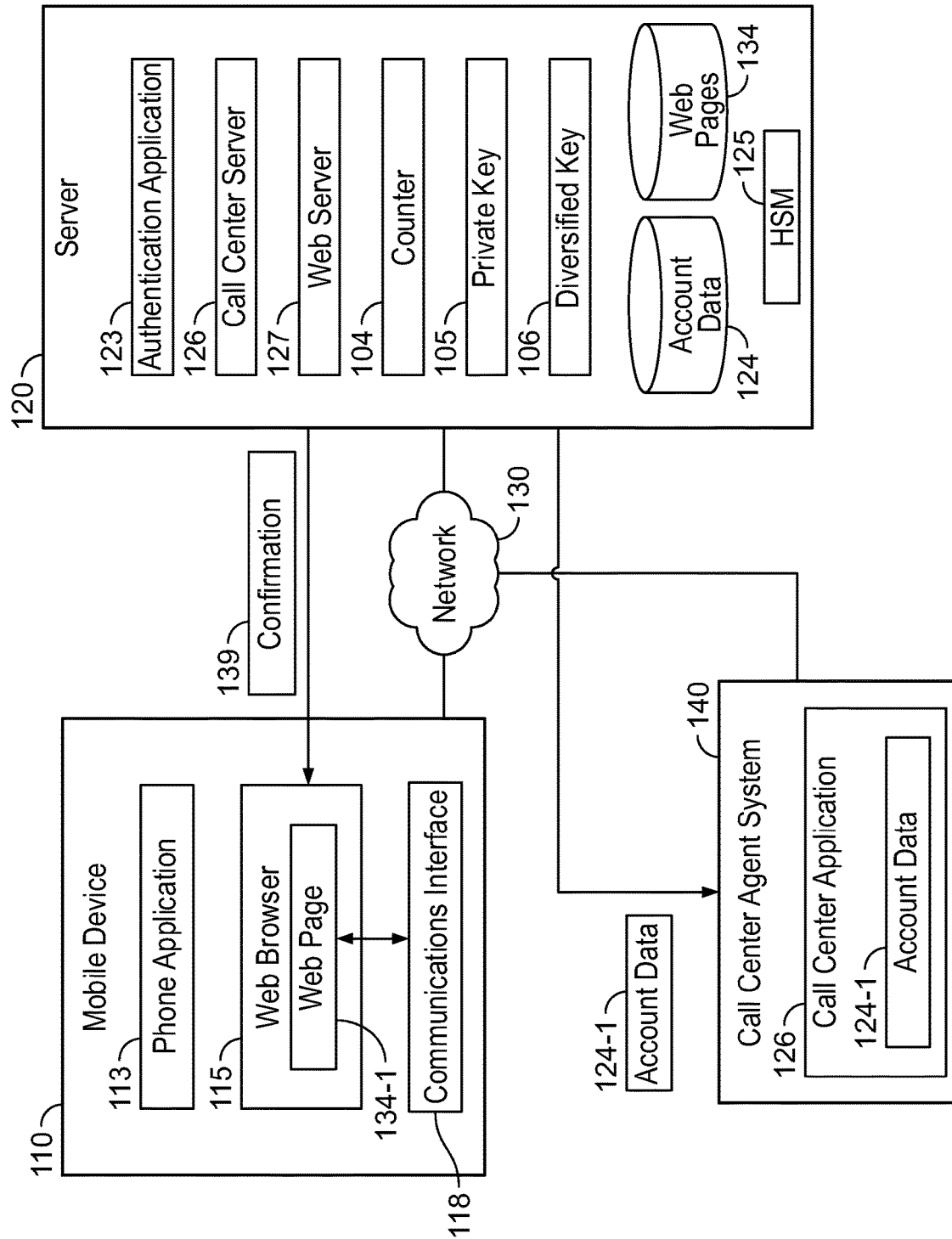

FIG. 1D illustrates an embodiment where the authentication application 123 has successfully decrypted the cryptogram 148, thereby verifying (or authenticating) the cryptogram, and by association, the identity of the user placing the phone call. As shown, the authentication application 123 transmits a confirmation 139 to the device 110, where the confirmation 139 indicates that the authentication application 123 successfully decrypted the cryptogram 148 and that the session ID of the URL 108 matches the session ID stored in the account data 124. The web page 134-1 may be updated to reflect the confirmation 139. In another embodiment, the confirmation 139 is a web page 134, and the web browser 115 may display the confirmation 139 web page 134.

Although not depicted, the authentication application 123 may provide the confirmation 139 to the web server 127, call center application 126 of the server 120, and/or the call center application 126 of the call center agent system 140 assigned to the phone call. Furthermore, as shown, the call center application 126 may transmit one or more elements of account data 124-1 to the call center application 126 of the agent system 140 used by the agent assigned to the call, e.g., based on the one or more agent identifiers associated with the session ID. Doing so displays different account attributes in one or more GUIs provided by the call center application 126, such as name, address, or other user information. In another embodiment, the account data 124-1 is already stored by the call center application 126 but is obfuscated or otherwise not exposed via the GUI of the call center application 126 until the account is authenticated for the call. In such an example, the GUI of the call center application 126 may expose the stored elements of account data 124 when receiving the confirmation 139, or another indication from the server 120, indicating the session ID matches the stored session ID, the session ID has not expired, and the cryptogram 148 was successfully decrypted.

Advantageously, the caller is authenticated and the account data 124-1 is exposed via the call center application 126 on the agent system 140 without requiring the device 110 to execute a dedicated client application provided by an entity associated with the call center application 126 (e.g., the application provided by the financial institution associated with the contactless card 101).

Figure 2A:
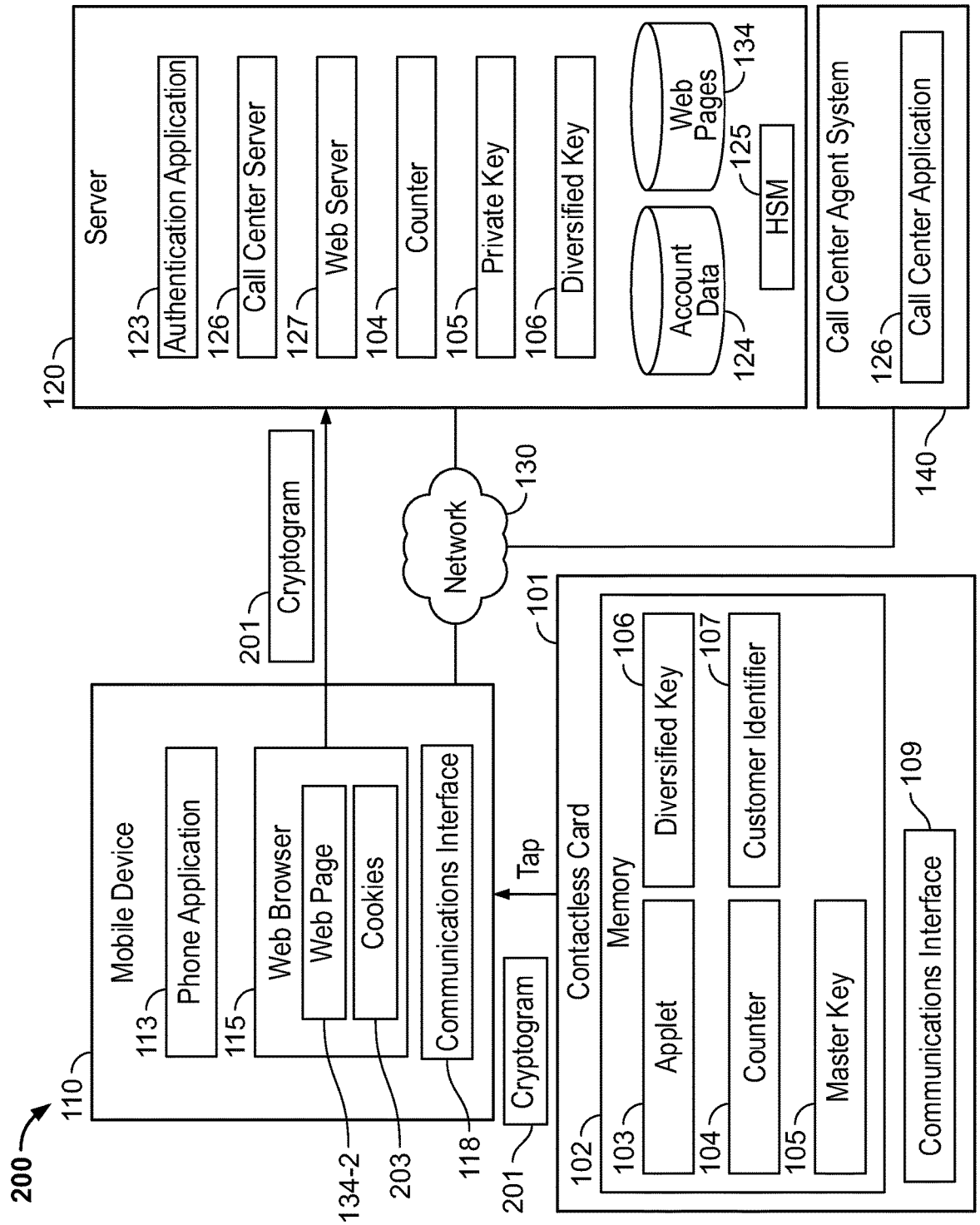
FIGS. 2A-2E illustrate embodiments of a system.

FIG. 2A depicts a schematic of an exemplary system 200, consistent with disclosed embodiments. Although the system 200 shown in FIGS. 2A-2E has a limited number of elements in a certain topology, it may be appreciated that the system 200 may include more or less elements in alternate topologies as desired for a given implementation.

Generally, FIGS. 2A-2E depict embodiments of using the contactless card 101 to initiate a pre-authenticated call between the device 110 and the call center application 126 of the server 120. As shown, the web browser 115 of the device 110 has loaded a web page 134-2. The web page 134-2 is received from the web server 127 responsive to a request to access the web page 134-2. The web page 134-2 may include similar capabilities to the web page 134-1, including the ability to communicate with the contactless card 101, e.g., by reading data generated by the contactless card 101 and/or writing data to the memory of the contactless card 101. The web page 134-2 and/or the web browser 115 may therefore generally be able to control the NFC capabilities of the communications interface 118 to communicate with the contactless card 101 via NFC.

In the embodiment depicted in FIG. 2A, the web page 134-2 may instruct the user to tap the contactless card 101 to initiate a pre-authenticated call to the call center application 126 of the server 120. The user may then tap the card 101 to the device 110.

Doing so causes the applet 103 of the contactless card 101 to generate a cryptogram 201 (e.g., an encrypted customer ID 107) based on the customer ID 107 and a diversified key 106 as described above. The web browser 115 and/or the web page 134-2 may then read the cryptogram 201, e.g., via NFC. In some embodiments, the applet 103 includes an unencrypted customer ID 107 and/or some other user identifier in a data package with the cryptogram 201 to allow the server 120 to perform the relevant decryption operations. Once read, the web browser 115 and/or the web page 134-2 may transmit the cryptogram 201 to the authentication application 123 for processing. The web page 134-2 and/or web browser 115 may further indicate, to the authentication application 123, that the cryptogram was read from the contactless card 101 via the card reader 118 of the device 110.

Once received, the authentication application 123 may attempt to verify the cryptogram. In at least one embodiment, the unencrypted customer ID 107 provided by the applet 103 may be used to identify the relevant account, counter value 104, and/or master key 105 in the account data 124. The authentication application 123 may attempt to decrypt the cryptogram by providing the master key 105 and incremented counter value 104 as input to the cryptographic algorithm, which produces the diversified key 106 as output. The resulting diversified key 106 may correspond to the instance of the diversified key 106 generated by the contactless card 101 to create the cryptogram 201, which may be used to decrypt the cryptogram. Generally, the authentication application 123 may transmit a decryption result to the web browser 115 and/or the web page 134-2 indicating whether the decryption was successful or unsuccessful.

Figure 2B:
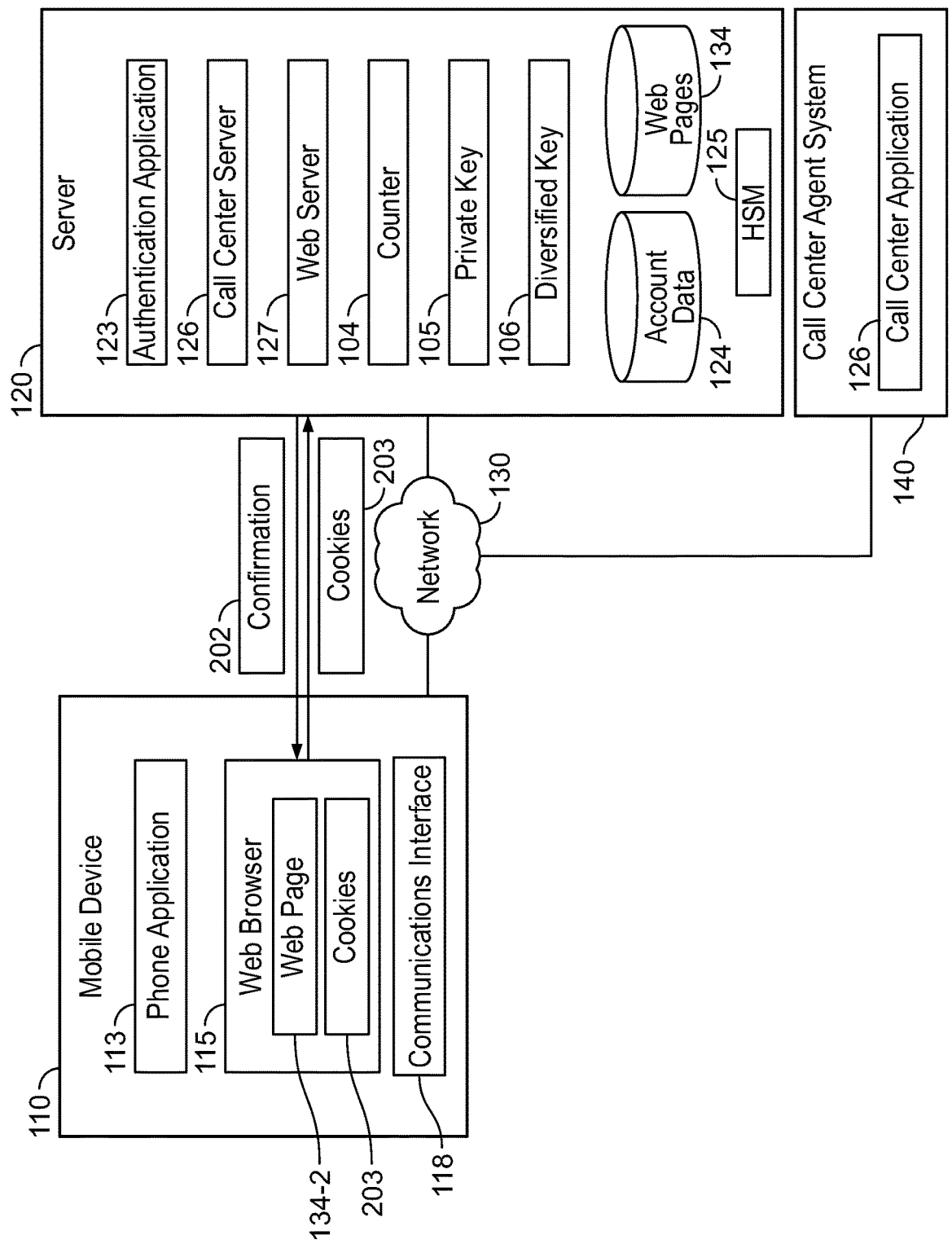

FIG. 2B depicts an embodiment where the server 120 transmits a confirmation 202 to the device 110. The confirmation 202 generally includes a decryption result indicating that the cryptogram 201 was authenticated, verified, or otherwise successfully decrypted. The web browser 115 and/or the web page 134-2 may receive the confirmation 202, which may further include instructions to provide one or more cookies 203 of the web browser 115 to the web server 127. Generally, the cookies 203 may include a hash value or other identifier used to indicate that the web browser was used to successfully authenticate the account associated with the customer ID 107. In response, the web browser 115 and/or the web page 134-2 may transmit the relevant cookie(s) 203 to the web server 127.

Once received, the web server 127 may determine whether the cookie 203 has expired based on a date of the cookie, whether the hash value in the cookie is a valid hash value assigned to the account in the account data 124, and any other type of processing of the cookie 203. If the cookie 203 is not validated, e.g., based on an invalid hash value and/or an expired cookie, one or more alternate forms of authentication may be required. For example, the web server 127 and/or call center application 126 may transmit a one-time password (OTP) to a device associated with the account in the account data 124. If the user provides the correct code (e.g. via the web page 134-2), the OTP may be validated in lieu of the cookie 203. In another embodiment, the web server 127 and/or call center application 126 of the server 120 may perform a stability check on one or more phone numbers reflected in the account data 124 for the account. For example, if the phone number has been stored in the account data 124 for a time period greater than a threshold amount of time (e.g., 1 week, 1 month, etc.), the phone number may be validated in lieu of the cookie 203. If the cookie validation, OTP validation, and/or phone number stability check fail, an indication of the failure is transmitted to the web browser 115 and/or the web page 134-2.

Figure 2C:
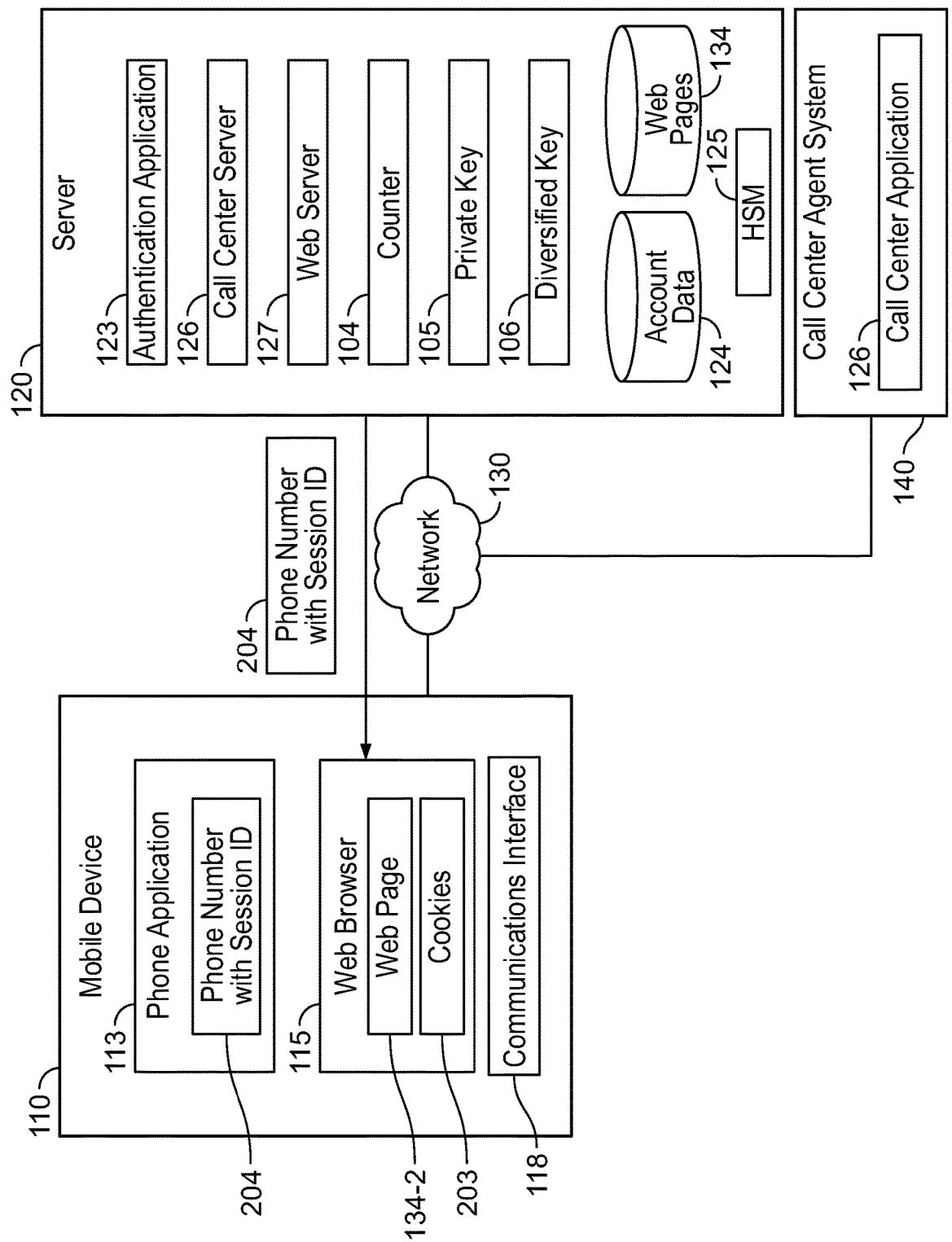

FIG. 2C reflects an embodiment where the web server 127 validated the cookies 203 received from the web browser 115. However, FIG. 2C may further reflect an embodiment where the OTP is validated and/or the phone number stability check reveals the phone number has been registered to the account for an amount of time greater than the threshold.

Based on the validation of the cookies 203, the call center application 126 of the server 120 may generate a session ID for a pre-authenticated call. The session ID may be a hash value or other unique identifier that is associated with the account and a phone number associated with the account in the account data 124. The session ID may further be associated with a time limit, such as 30 seconds, 10 minutes, 30 minutes, etc. The call center application 126 of the server 120 may then select a pre-authenticated phone number from among a plurality of pre-authenticated phone numbers and append the session ID as a parameter of the phone number to generate a phone number with session ID 204. For example, if the pre-authenticated phone number is 1-555-555-1212, and the session ID is "56789", the phone number including the session ID 204 may be "1-555-555-1212#56789". The call center application 126 of the server 120 may provide the phone number with session ID 204 to the web server 127. The web server 127 may then transmit the phone number with session ID 204 to the web browser 115. Additionally and/or alternatively, the call center application 126 of the server 120 may transmit the phone number with session ID 204 to the device 110 via other methods, such as SMS message, email, etc. Once received, the user may select the phone number with session ID 204 to initiate a call to the call center application 126 of the server 120 at the pre-authenticated number. In some embodiments, the web server 127 may update the cookies 203 (e.g., to include a new expiration date and/or a new hash value) based on the validation of the cookies 203 and/or the decryption of the cryptogram 201. Further still, if a cookie 203 does not exist, the web server 127 may store (or write) a cookie 203 in the web browser 115 based at least in part on the decryption of the cryptogram 201. The web server 127 may also update the account data 124 to reflect the new and/or updated cookies 203.

In some embodiments, the cookies 203 may be processed prior to and/or contemporaneously with the generation and/or processing of the cryptogram 201. In such examples, the cookies 203 may specify a hash value which corresponds to one or more accounts in the account data 124. Doing so allows the server 120 to identify the master key 105 and counter value 104 of the corresponding account to generate a diversified key 106 and decrypt the cryptogram 201 without requiring the contactless card 101 and/or the web browser 115 to provide the customer ID 107 to the server 120. Similarly, if the cookies are not validated (e.g., a cookie does not exist and/or includes an expired or otherwise invalid hash value), the server 120 may refrain from decrypting the cryptogram 201 to conserve resources.

Figure 2D:
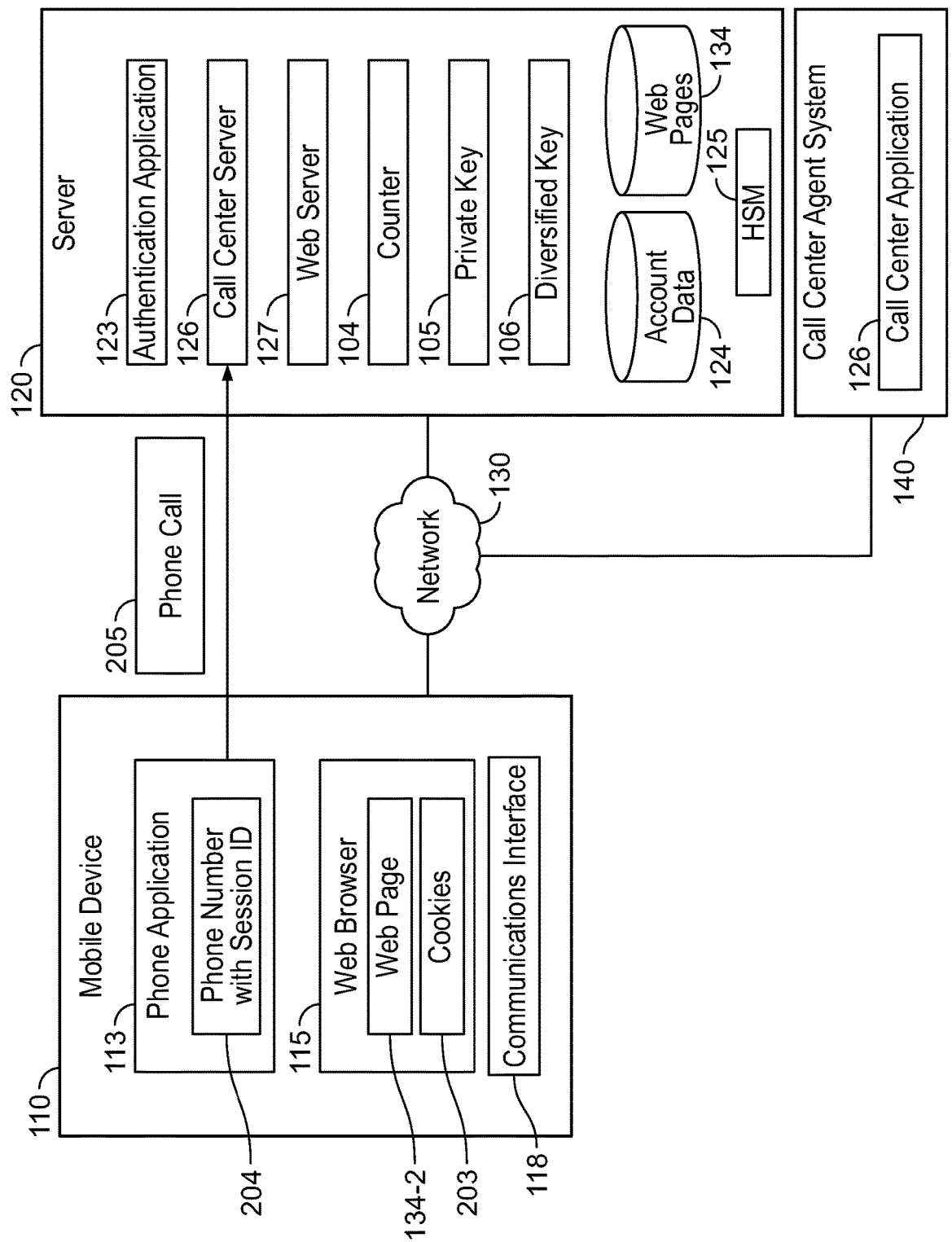

FIG. 2D depicts an embodiment where a phone call 205 is initiated by the phone application 113 of the client device 110. The phone call 205 may be directed to the phone number with session ID 204. Once answered by the call center application 126 of the server 120, the phone application 113 may provide the session ID as input, e.g., by programmatically entering the digits "56789" after some initial delay.

The call center application 126 of the server 120 may then determine whether the phone call 205 is directed to one of the plurality of pre-authenticated numbers. The call center application 126 of the server 120 may then receive the session ID from the phone application 113 and determine whether the session ID is valid. For example, the call center application 126 of the server 120 may compare the session ID to the session ID stored in the account data 124. If a match exists, the call center application 126 of the server 120 may determine whether the time limit for the session ID has not expired (e.g., whether the call is received within a threshold amount of time from when the session ID was generated). Additionally, the call center application 126 of the server 120 may determine whether the call is received from a phone number associated with the account in the account data 124. If the phone call is directed to one of the plurality of pre-authenticated numbers, that the session ID is valid and has not expired, and the phone call is received from a phone number associated with the account in the account data 124, the call center application 126 of the server 120 may authenticate the pre-authenticated call. Otherwise, the call center application 126 of the server 120 may reject the pre-authenticated call, or perform another operation for the call (e.g., requiring the user to authenticate using other methods when speaking to the customer service agent).

Figure 2E:
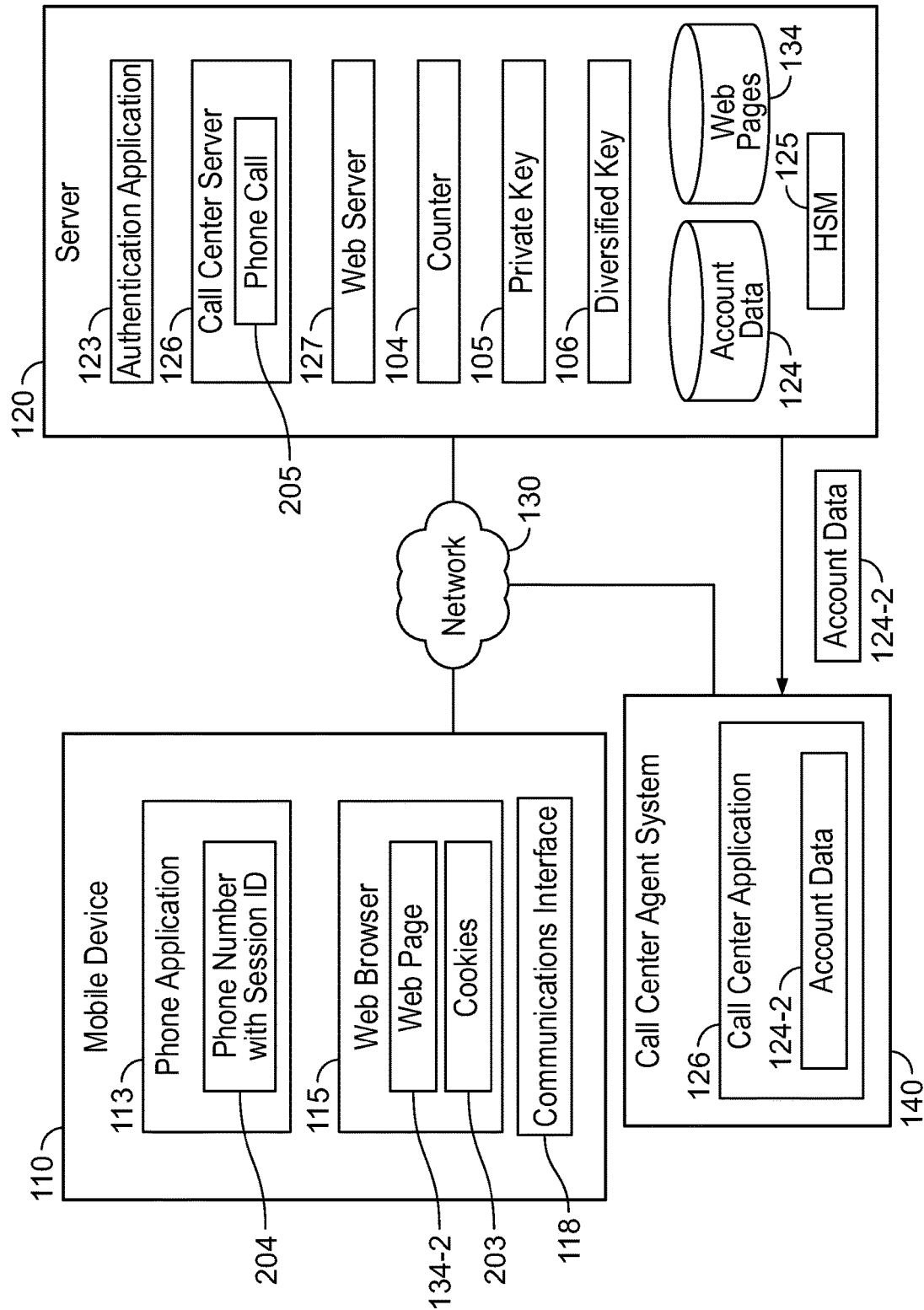

FIG. 2E depicts an embodiment where the call center application 126 has authenticated the pre-authenticated call 205. Generally, when a pre-authenticated call is authenticated as described above, the call 205 may be directly connected to an agent without requiring the user to wait while the agents handle calls from other callers. For example, if 10 callers are in a queue waiting to have calls handled, the pre-authenticated call 205 may be answered and handled prior to the other 10 calls in the queue, as the pre-authenticated call 205 is placed at the front of the queue. Similarly, the user is not required to provide any information when connected to the agent. Further still, as shown in FIG. 2E, the call center application 126 of the server 120 may provide account data 124-1 to the call center application 126 of the agent system 140. Doing so allows the agent to view the relevant account details as the call is connected and without requiring additional input from the caller. In some embodiments, the web server 127 may update the cookies 203 (e.g., to include a new expiration date and/or a new hash value) based on the authentication of the pre-authenticated call. Further still, if a cookie 203 does not exist, the web server 127 may store a cookie 203 in the web browser 115 based at least in part on the decryption of the cryptogram 201. The web server 127 may also update the account data 124 to reflect the new and/or updated cookies 203.

FIG. 3A is a schematic 300 illustrating an example mobile computing device 110. As shown, a mobile device 110 has received a URL 301. The URL 301 may include a session ID parameter, e.g., the "123456" portion of the URL 301. The session ID parameter may be generated responsive to a call placed by a user of the device 110 to the call center application 126. The call center application 126 of the server 120 may route the call to an agent. The agent may use the agent system 140 to instruct the call center application 126 of the server 120 to generate the session ID and URL 301 for the customer. The session ID parameter may be associated with the account, the phone call, and/or the agent assigned to the phone call in the account data 124. The session ID may be restricted to a limited time of validity, e.g., 10 minutes. The call center application 126 of the server 120 may then transmit the URL 301 to the device 110. The URL 301 may generally be directed to a web page 134 and/or any other resource associated with the server 120. In some embodiments, the URL 301 is directed to one or more web pages 134 associated with the call center application 126 and/or web server 127. The URL 301 may be specified in a text message or other type of message sent to the device 110. Once selected, the web browser 115 may be opened to access resource at the URL 301.

FIG. 3B is a schematic 310 depicting an embodiment where the web page at the URL 301 has been accessed. Because the URL 301 includes the session ID parameter, the web server 127, call center application 126, or any other component of the server 120 may extract the session ID parameter and compare the extracted session ID parameter to the session ID parameter stored in the account data 124. If the comparison results in a match, the web server 127, call center application 126, or any other component of the server 120 may determine whether the web page at the URL is accessed (or requested) within the time threshold for the session ID, e.g., within 10 minutes continuing with the previous example. If the web page is accessed within the time threshold, the web server 127, call center application 126, or any other component of the server 120 may validate the session ID.

In response, the web server 127, call center application 126, or any other component of the server 120 updates the web page in the web browser 115 (and/or loads a new web page in the web browser 115) to instruct the user to tap the contactless card 101 to the mobile device 110. The user may tap the contactless card 101 to the device 110. Doing so causes the web browser 115 and/or the web page in the browser 115 to instruct the applet 103 of the contactless card 101 to generate a cryptogram, e.g., the cryptograms 148 or 201. More generally, the cryptogram may be generated by the applet 103 incrementing the counter 104, encrypting the counter 104 and master key 105 to generate an instance of a diversified key 106, and encrypt the customer ID 107 using the diversified key 106. The applet 103 may then transmit or otherwise provide the cryptogram to the mobile device 110, e.g., via NFC. Once received, the web browser 115 may transmit the cryptogram to the server 120, e.g., via the HTTP protocol. The web page and/or web browser 115 may further indicate, to the server 120, that the cryptogram was read from the contactless card 101 via the card reader 118 of the device 110. The web server 127 or any other component of the server 120 may then instruct the authentication application 123 to decrypt the cryptogram.

As shown in FIG. 3B, the authentication application 123, the web server 127, or any other component of the server 120 may return a decryption result to the mobile device 110 indicating whether the cryptogram was decrypted or not decrypted. The mobile device 110 may determine, based on the decryption result, that the cryptogram was decrypted. As shown, the decryption result indicates that the authentication application 123 decrypted the cryptogram, and the authentication for the call is complete. Doing so allows the call center agent to proceed with assisting the caller. In some embodiments, the call center application 126 of the server 120 exposes account attributes from the account data 124 on a GUI of the call center application 126 of the agent system 140 associated with the session ID and/or the call. If, however, the decryption is not successful and/or the session ID is not validated, the authentication for the call may fail, and access to the account data 124 may be restricted to preserve security.

Figures 4A, 4B:
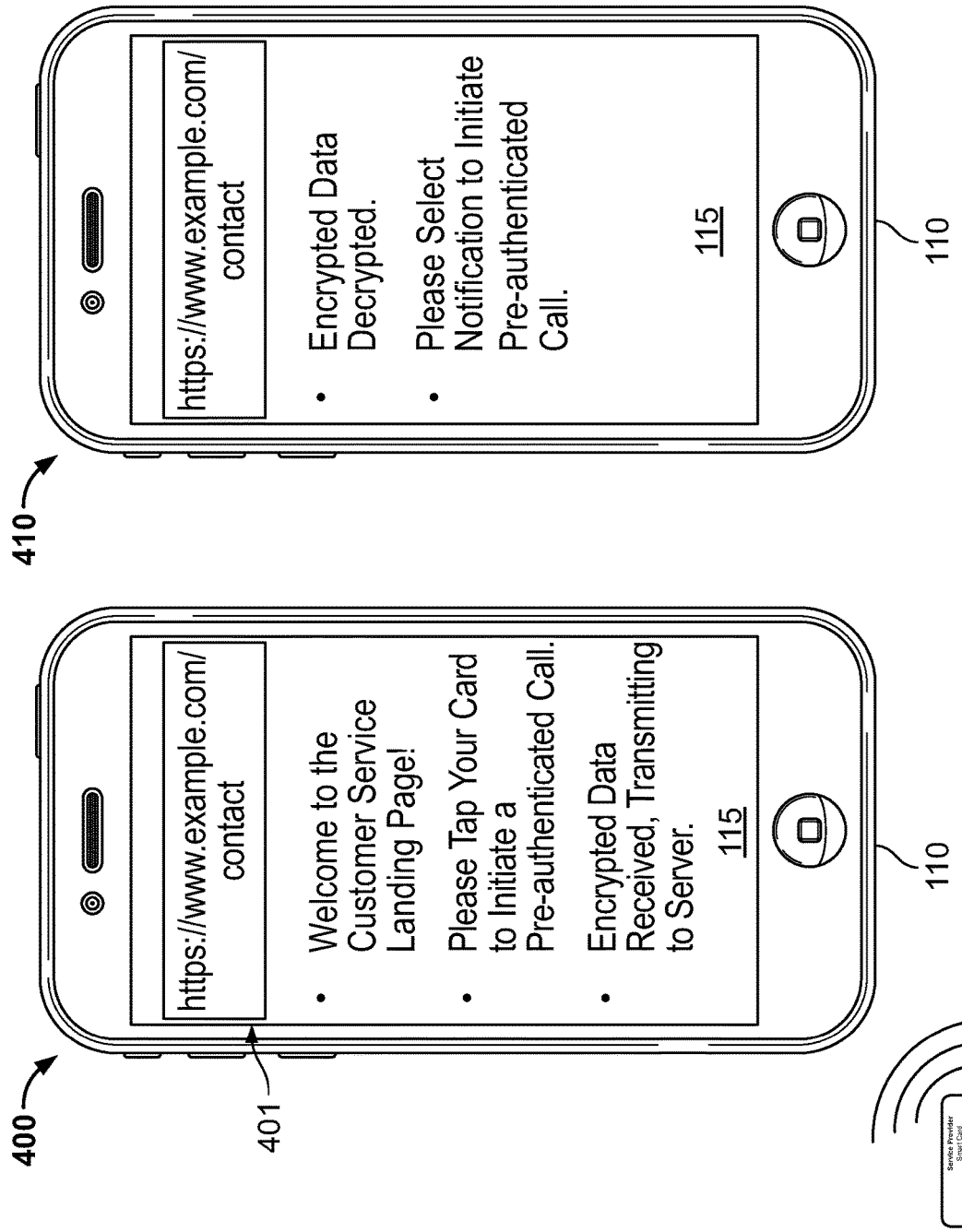
FIGS. 4A-4D illustrate embodiments of a system

FIG. 4A is a schematic 400 illustrating an embodiment of using a contactless card 101 to initiate a pre-authenticated call to the call center application 126 of the server 120. As shown, a mobile device 110 executing a web browser 115 has accessed a web page at a URL 401. The URL 401 may generally be directed to a web page 134 and/or any other resource associated with the server 120. In some embodiments, the URL 401 is directed to one or more web pages associated with the call center application 126 and/or web server 127.

As shown, the web page at the URL 401 instructs the user to tap the contactless card 101 to the mobile device 110. In some embodiments, the instruction to tap the contactless card 101 is based on the web page and/or web server 127 reading one or more cookies of the web browser 115. For example, if the cookies store a known, valid hash value, the web server 127 may permit the pre-authenticated phone call flow to proceed. The user may tap the contactless card 101 to the device 110. Doing so causes the web browser 115 and/or the web page in the browser 115 to instruct the applet 103 of the contactless card 101 to generate a cryptogram, e.g., the cryptograms 148 or 201. More generally, the cryptogram may be generated by the applet 103 incrementing the counter 104, encrypting the counter 104 and master key 105 to generate an instance of a diversified key 106, and encrypt the customer ID 107 using the diversified key 106. The applet 103 may then transmit or otherwise provide the cryptogram to the mobile device 110, e.g., via an NFC read. Once received, the web browser 115 may transmit the cryptogram to the server 120, e.g., via the HTTP protocol. The web page and/or web browser 115 may further indicate, to the server 120, that the cryptogram was read from the contactless card 101 via the card reader 118 of the device 110. The web server 127 or any other component of the server 120 may then instruct the authentication application 123 to decrypt the cryptogram.

In some embodiments, the customer ID 107 is sent with the cryptogram, e.g., to allow the server 120 to identify the proper master key 105 and counter 104. Doing so allows the authentication application 123 to increment the counter 104 of the server 120 associated with the account, generate an instance of the diversified key 106 using the counter 104 and master key 105 associated with the account, and decrypt the cryptogram using the diversified key 106. Similarly, in some embodiments, the cookies are sent with the cryptogram, e.g., to allow the web server 127 to determine whether the cookies include a valid hash value as described above. If a hash value is not present in a cookie, the server 120 may refrain from decrypting the cryptogram and generally refrain from allowing the user to use the pre-authenticated call feature.

FIG. 4B is a schematic 410 illustrating an embodiment where the authentication application 123 has decrypted the cryptogram. As shown, the web page in the web browser 115 reflects that the cryptogram was successfully decrypted, e.g., based on a decryption result received from the server 120. Furthermore, the web page in the web browser 115 instructs the user to select a forthcoming notification to initiate the pre-authenticated call.

Figure 4D:
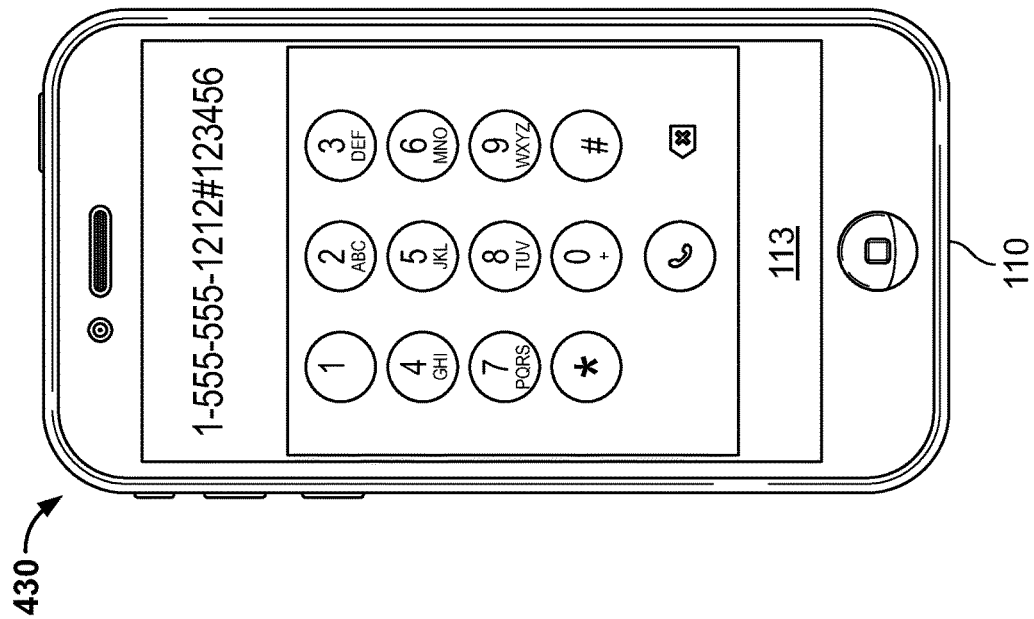
Figure 4C:
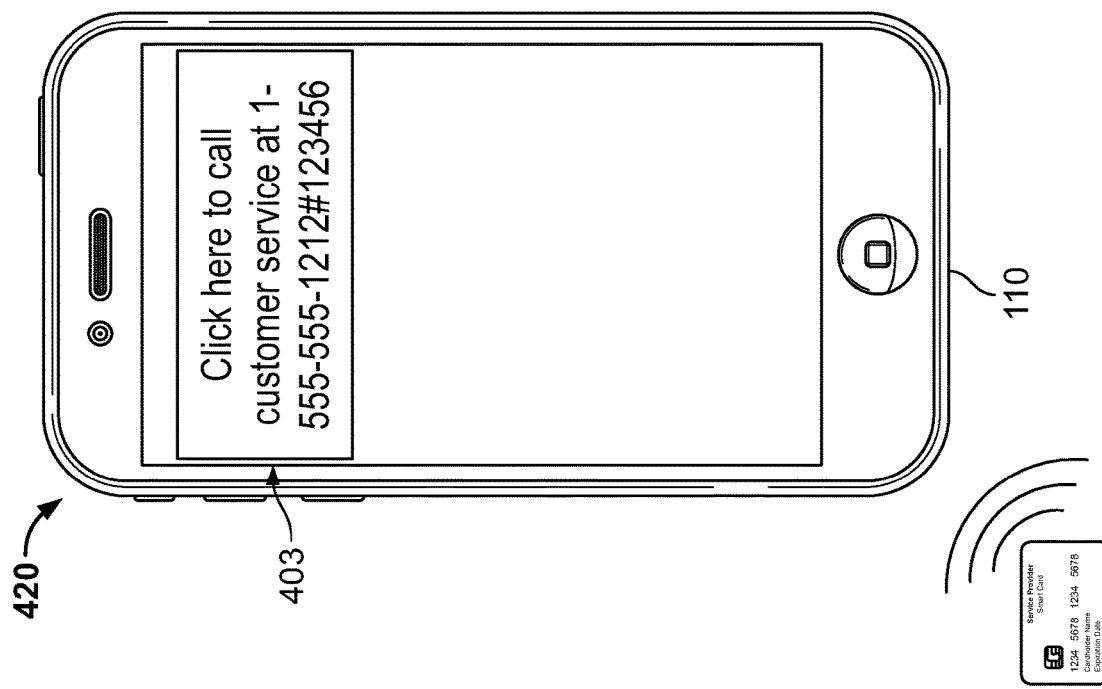

FIG. 4C is a schematic 420 illustrating an embodiment where the mobile device 110 receives a notification 403 including a pre-authenticated phone number. The phone number includes a session ID parameter generated by the call center application 126 of the server 120, e.g., "123456". The notification 403 may be received as an SMS message, email, or any other type of notification. In some embodiments, the web page in the web browser 115 depicted in FIG. 4B may output the notification 403 and/or the relevant information from the notification 403. The pre-authenticated phone number is directed to the call center application 126 of the server 120 and may be associated with the session ID and the associated account (e.g., based on the customer ID 107) in the account data 124. As stated, the session ID may be limited to a predetermined amount of time of validity.

FIG. 4D is a schematic 430 illustrating an embodiment where the user has selected the notification 403. Doing so opens the phone application 113 and causes the phone application 113 to place a call to the number specified in the notification 403. Once answered by the call center application 126 of the server 120, the phone application 113 may provide the session ID parameter as input, e.g., by providing "123456" as input after some predefined time delay.

The call center application 126 of the server 120 may then process the incoming call and associated input. Generally, the call center application 126 determines whether the phone call is directed to a pre-authenticated phone number. If the call is directed to the pre-authenticated phone number, the call center application 126 determines whether the correct session ID is received as input. For example, the call center application 126 of the server 120 may compare the received session ID to the session ID for the pre-authenticated call stored in the account data 124. If the comparison results in a match, the call center application 126 of the server 120 determines whether the phone call is received while the session ID is still valid, e.g., whether the call is received within the time limit assigned to the session ID. For example, if the time limit for the session ID is 5 minutes, and the call is received in 4 minutes, the call center application 126 of the server 120 determines the session ID is valid. The call center application 126 of the server 120 may then directly connect the pre-authenticated call to an agent. Doing so may include allowing the pre-authenticated call to skip other calls waiting in line. Furthermore, doing so may populate the GUI of the call center application 126 with one or more attributes of the account from the account data 124.

Figure 5:
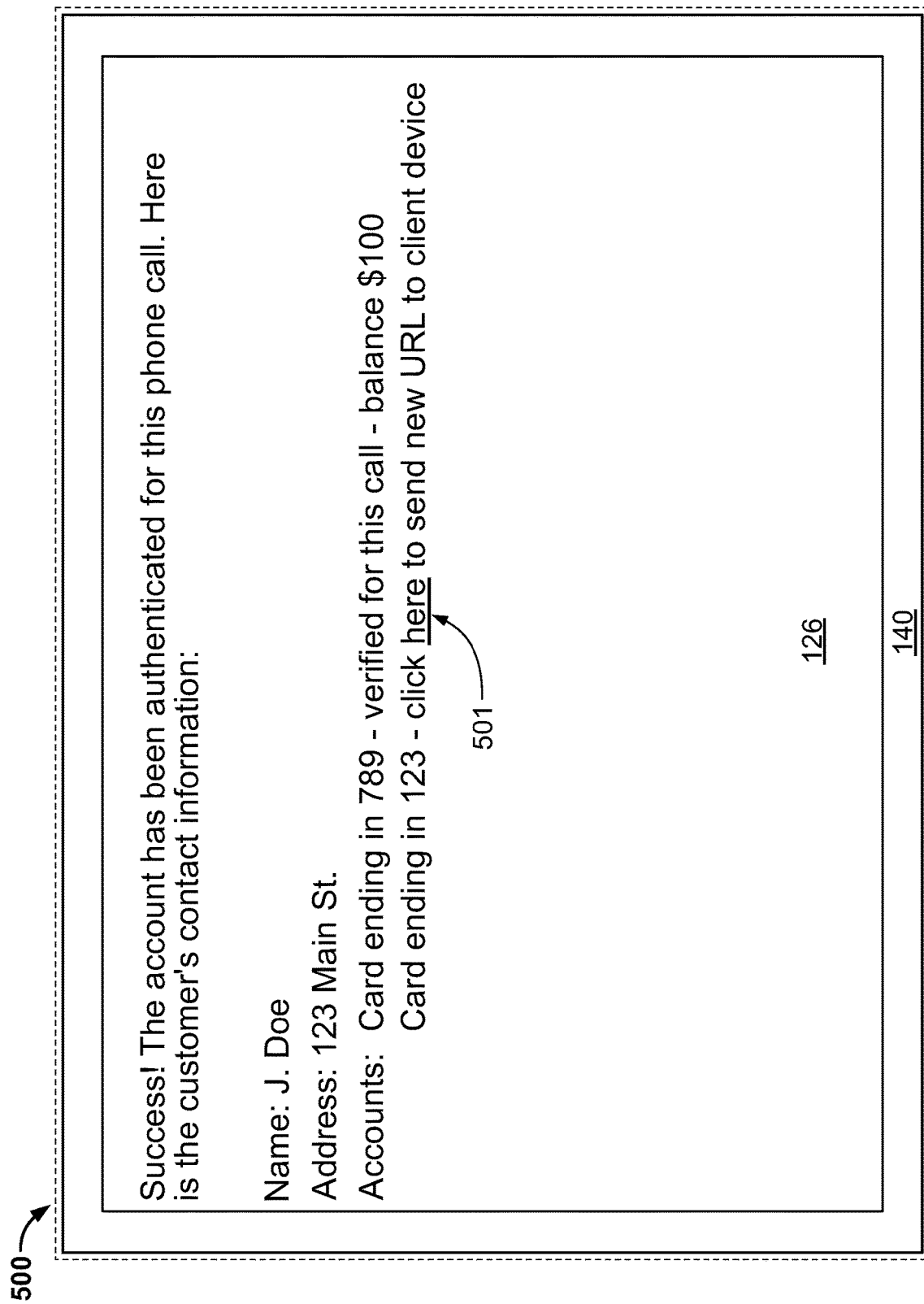
FIG. 5 illustrates an example user interface.

FIG. 5 is a schematic 500 depicting an example agent device 140 executing an instance of the call center application 126. Generally, once a call is authenticated using one or more of the techniques described herein, the GUI of the call center application 126 may output one or more elements of data from the account data 124 for the authenticated account. For example, as shown, the GUI depicts a name, address, and information regarding one or more accounts of the user. The GUI further includes a link 501 that, when selected, causes the call center application 126 of the server 120 to generate a session ID for a call, associate the session ID to the account ending in 123 and the call, and transmit a URL with session ID 108 to the device 110 as described above. Once the URL is accessed in the web browser 115, the user may tap the contactless card 101 to generate a cryptogram, which is sent to the server 120 for decryption. Upon successful decryption of the cryptogram and a comparison of the session ID in the URL 108 and the stored session ID resulting in a match, the call may be authenticated for that account. In such an embodiment, additional details for this account may be exposed. For example, while the balance is displayed for the account ending in 789 (e.g., based on successful authentication for the call using the card ending in 789 using one or more techniques described herein), the balance of the account ending in 123 is not displayed. Therefore, if the call is authenticated using the contactless card 101 ending in 123, the account balance for the account ending in 123 (and/or other details) may be displayed. Advantageously, therefore, security may be enhanced by requiring the different contactless cards 101 to authenticate access to the associated accounts while on the same call with the call center agent.

Figure 6A:
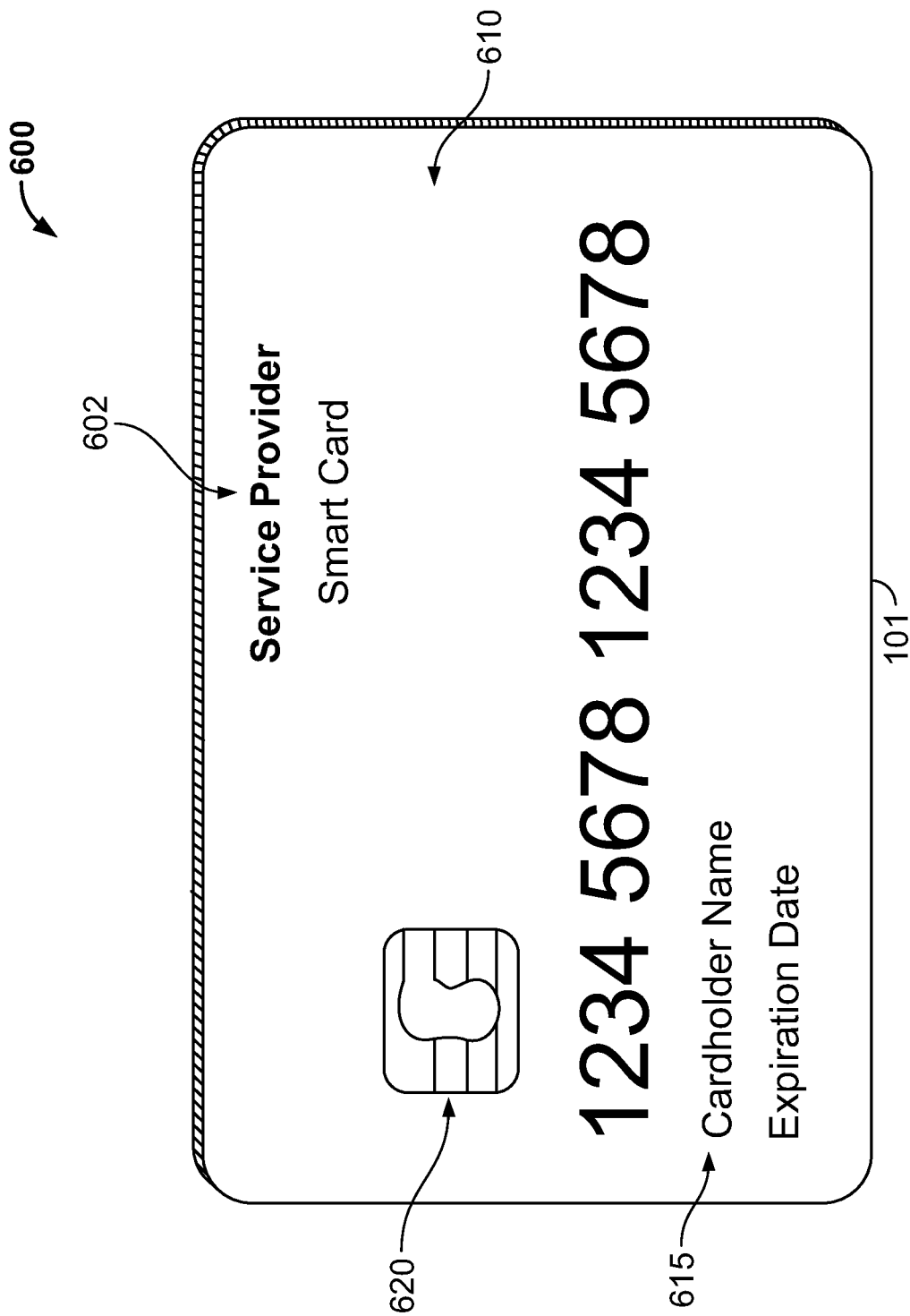
FIGS. 6A-6B illustrate an example contactless card.

FIG. 6A is a schematic 600 illustrating an example configuration of a contactless card 101, which may include a payment card, such as a credit card, debit card, or gift card, issued by a service provider as displayed as service provider indicia 602 on the front or back of the contactless card 101. In some examples, the contactless card 101 is not related to a payment card, and may include, without limitation, an identification card. In some examples, the contactless card may include a dual interface contactless payment card, a rewards card, and so forth. The contactless card 101 may include a substrate 610, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

Figure 6B:
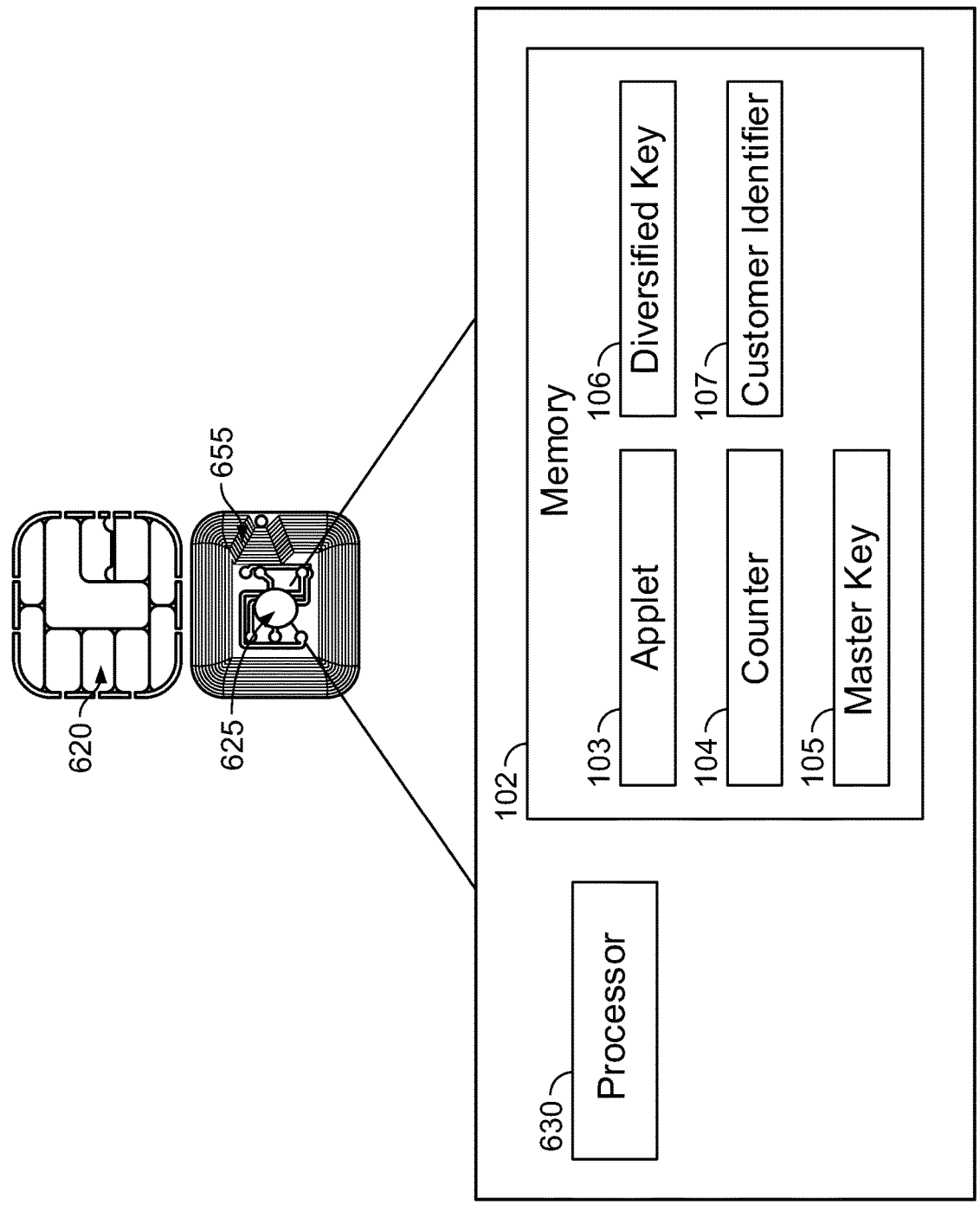

The contactless card 101 may also include identification information 615 displayed on the front and/or back of the card, and a contact pad 620. The contact pad 620 may include one or more pads and be configured to establish contact with another client device, such as an ATM, a user device, smartphone, laptop, desktop, or tablet computer via contactless cards. The contact pad may be designed in accordance with one or more standards, such as ISO/IEC 7816 standard, and enable communication in accordance with the EMV protocol. The contactless card 101 may also include processing circuitry, antenna and other components as will be further discussed in FIG. 6B. These components may be located behind the contact pad 620 or elsewhere on the substrate 610, e.g. within a different layer of the substrate 610, and may electrically and physically coupled with the contact pad 620. The contactless card 101 may also include a magnetic strip or tape, which may be located on the back of the card (not shown in FIG. 6A). The contactless card 101 may also include a Near-Field Communication (NFC) device coupled with an antenna capable of communicating via the NFC protocol. Embodiments are not limited in this manner.

As illustrated, the contact pad 620 of contactless card 101 may include processing circuitry 625 for storing, processing, and communicating information, including a processor 630, a memory 102, and one or more communications interface 109. It is understood that the processing circuitry 625 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 102 may be encrypted memory utilizing an encryption algorithm executed by the processor 630 to encrypt data.

The memory 102 may be configured to store one or more applets 103, one or more counters 104, the master key 105, a diversified key 106, and a customer ID 107. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The one or more counters 104 may comprise a numeric counter sufficient to store an integer. The customer ID 107 may comprise a unique alphanumeric identifier assigned to a user of the contactless card 101, and the identifier may distinguish the user of the contactless card from other contactless card users. In some examples, the customer ID 107 may identify both a customer and an account assigned to that customer and may further identify the contactless card 101 associated with the customer's account.

The processor 630 and memory elements of the foregoing exemplary embodiments are described with reference to the contact pad 620, but the present disclosure is not limited thereto. It is understood that these elements may be implemented outside of the contact pad 620 or entirely separate from it, or as further elements in addition to processor 630 and memory 102 elements located within the contact pad 620.

In some examples, the contactless card 101 may comprise one or more antenna(s) 655. The one or more antenna(s) 655 may be placed within the contactless card 101 and around the processing circuitry 625 of the contact pad 620. For example, the one or more antenna(s) 655 may be integral with the processing circuitry 625 and the one or more antenna(s) 655 may be used with an external booster coil. As another example, the one or more antenna(s) 655 may be external to the contact pad 620 and the processing circuitry 625.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the power connection of the contactless card 101, which may be functionally maintained through one or more capacitors. The contactless card 101 may communicate back by switching a load on the coil or load modulation. Load modulation may be detected in the terminal's coil through interference. More generally, using the antenna(s) 655, processor 630, and/or the memory 102, the contactless card 101 provides a communications interface to communicate via NFC, Bluetooth, and/or Wi-Fi communications.

As explained above, contactless card 101 may be built on a software platform operable on smart cards or other devices having limited memory, such as JavaCard, and one or more or more applications or applets may be securely executed. Applet 103 may be added to contactless cards to provide a one-time password (OTP) for multifactor authentication (MFA) in various mobile application-based use cases. Applet 103 may be configured to respond to one or more requests, such as near field data exchange requests, from a reader, such as a mobile NFC reader (e.g., of a mobile device or point-of-sale terminal) and produce an NDEF message that comprises a cryptographically secure OTP encoded as an NDEF text tag.

One example of an NDEF OTP is an NDEF short-record layout (SR=1). In such an example, one or more applets 103 may be configured to encode the OTP as an NDEF type 6 well known type text tag. In some examples, NDEF messages may comprise one or more records, such as a cryptogram 148, 201. The applets 103 may be configured to add one or more static tag records in addition to the OTP record.

In some examples, the one or more applets 103 may be configured to emulate an RFID tag. The RFID tag may include one or more polymorphic tags. In some examples, each time the tag is read, different cryptographic data is presented that may indicate the authenticity of the contactless card 101. Based on the one or more applet 103, an NFC read of the tag may be processed, the data may be transmitted to a server, such as a server of a banking system, and the data may be validated at the server.

In some examples, the contactless card 101 and server 120 may include certain data such that the card may be properly identified. The contactless card 101 may include one or more unique identifiers (not pictured). Each time a read operation takes place, the counter 104 may be configured to increment. In some examples, each time data from the contactless card 101 is read (e.g., by a computing device 110), the counter 104 is transmitted to the server for validation and determines whether the counter 104 are equal (as part of the validation) to a counter of the server.

The one or more counter 104 may be configured to prevent a replay attack. For example, if a cryptogram has been obtained and replayed, that cryptogram is immediately rejected if the counter 104 has been read or used or otherwise passed over. If the counter 104 has not been used, it may be replayed. In some examples, the counter that is incremented on the card is different from the counter that is incremented for transactions. The contactless card 101 is unable to determine the application transaction counter 104 since there is no communication between applet 103 on the contactless card 101. In some examples, the contactless card 101 may comprise a first applet 103-1, which may be a transaction applet, and a second applet 103-2, which may be an authentication applet for authenticating calls as disclosed herein. Each applet 103-1 and 103-2 may comprise a respective counter 104.

In some examples, the counter 104 may get out of sync. In some examples, to account for accidental reads that initiate transactions, such as reading at an angle, the counter 104 may increment but the application does not process the counter 104. In some examples, when the device 110 is woken up, NFC may be enabled and the device 110 may be configured to read available tags, but no action is taken responsive to the reads.

To keep the counter 104 in sync, an application, such as a background application, may be executed that would be configured to detect when the device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter 104 may be configured to move forward. But if within a different threshold number, for example within 10 or 1000, a request for performing re-synchronization may be processed which requests via one or more applications that the user tap, gesture, or otherwise indicate one or more times via the user's device. If the counter 104 increases in the appropriate sequence, then it is possible to know that the user has done so.

The key diversification technique described herein with reference to the counter 104, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 101, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 101. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 6.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 7:
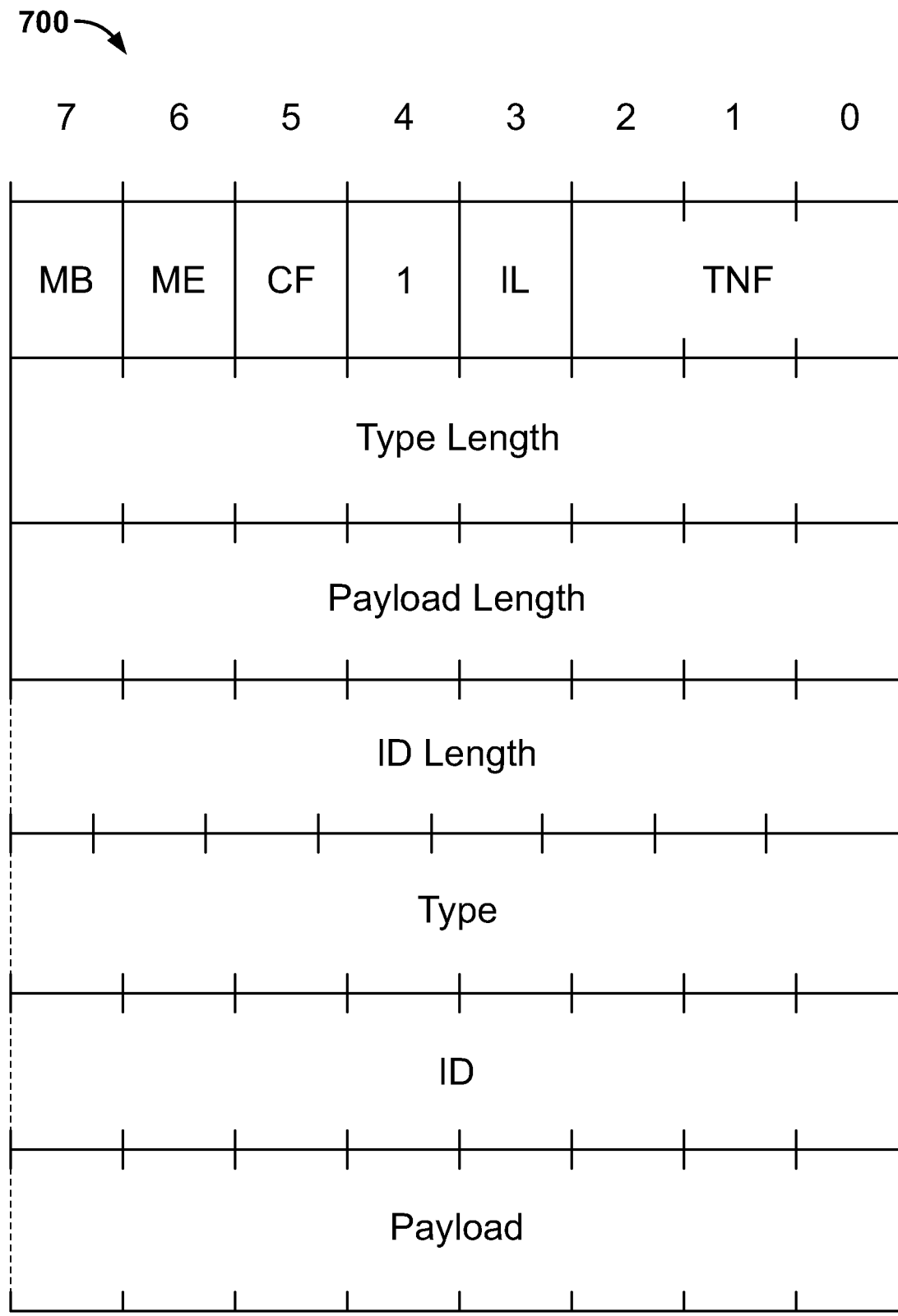
FIG. 7 illustrates a data structure in accordance with one embodiment.

FIG. 7 illustrates an NDEF short-record layout (SR=1) data structure 700 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850104; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. In various embodiments, the payload of the data structure 700 may store a cryptogram (e.g., an encrypted customer ID 107, the cryptogram 148, and/or the cryptogram 201) and any other relevant data.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some implementations. In addition, the given logic flow may be implemented by a hardware element, a software element executed by a processor, or any combination thereof. The embodiments are not limited in this context.

Figure 8:
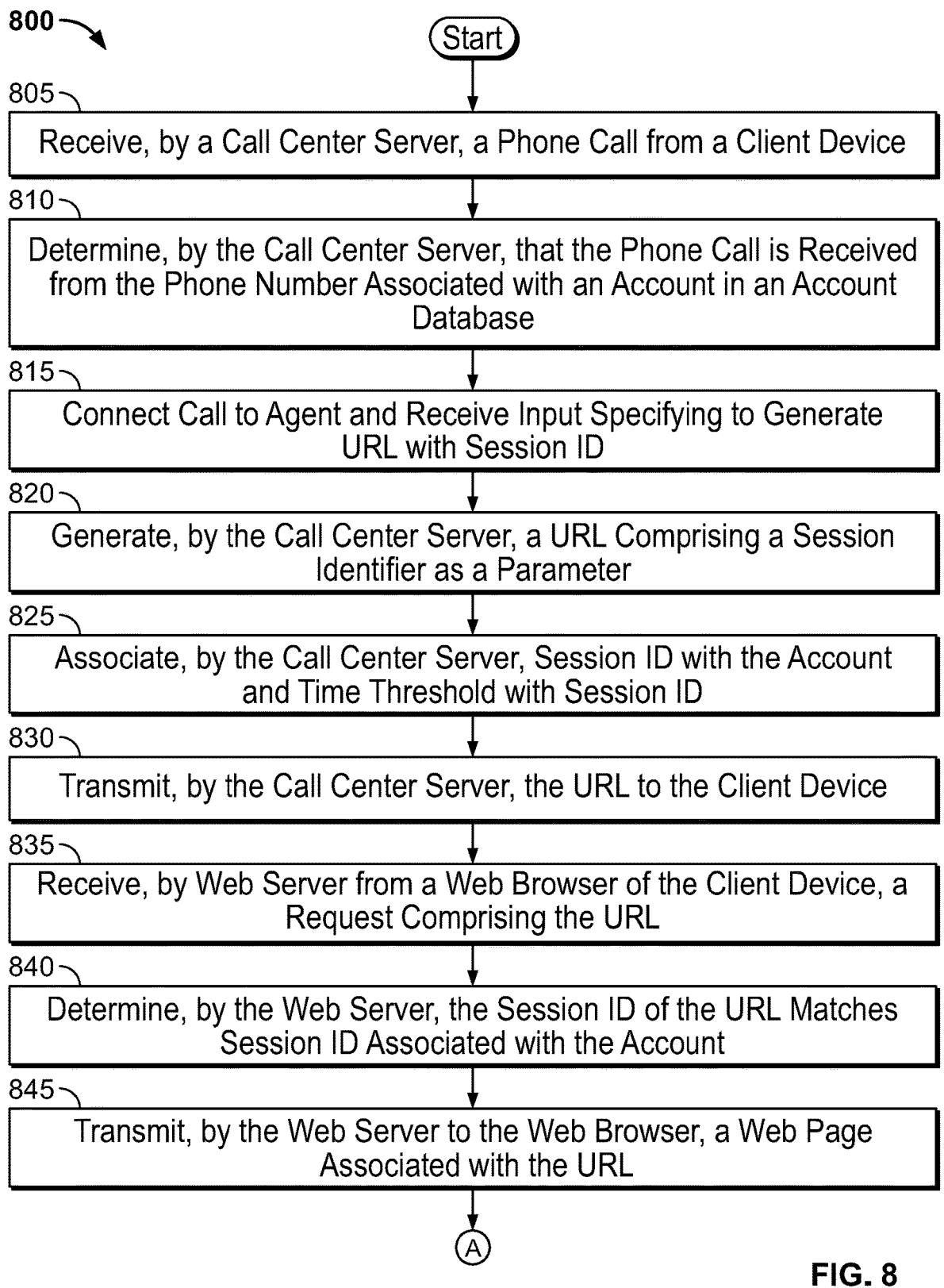
FIG. 8 illustrates a first logic flow.
Figure 8:
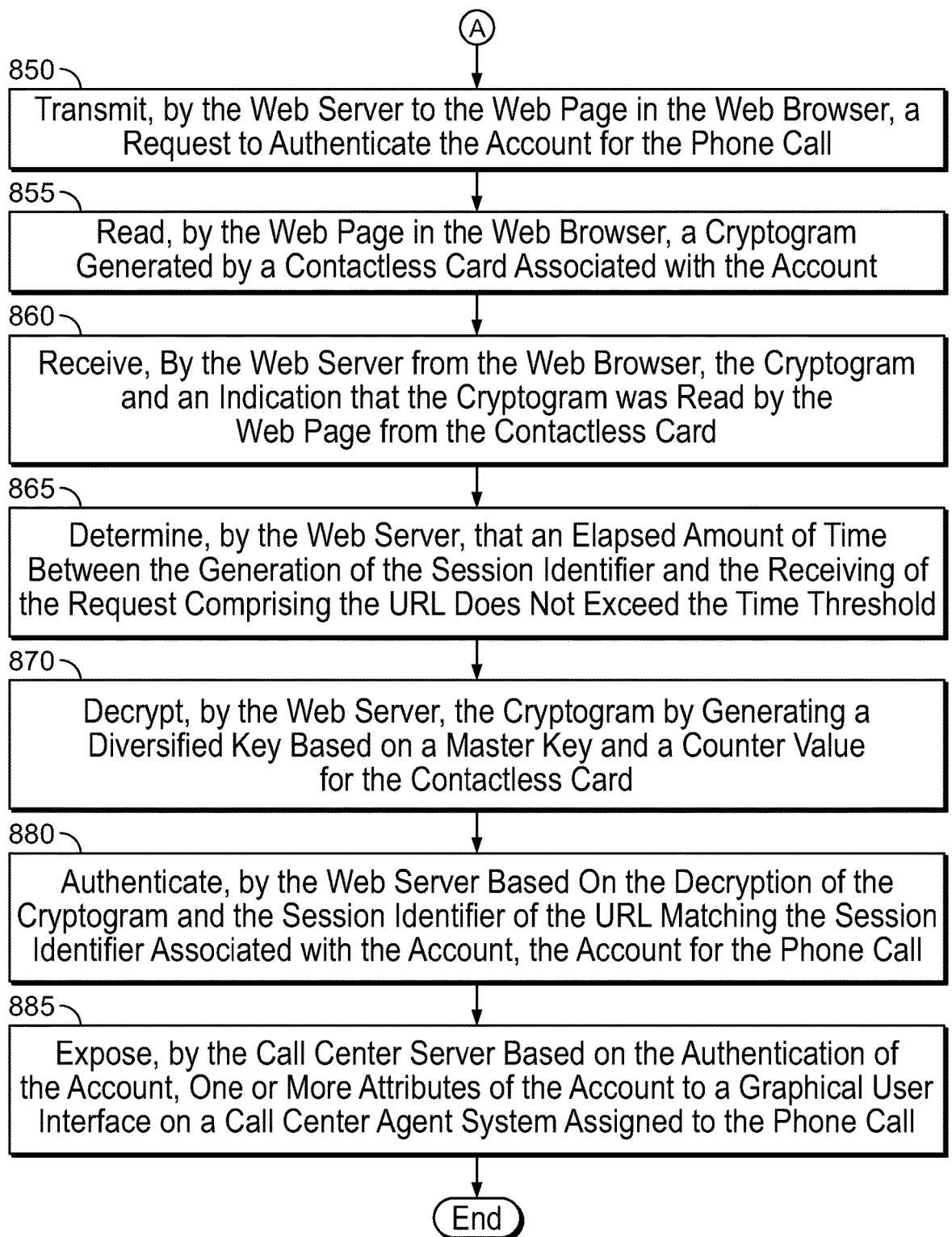

FIG. 8 illustrates an embodiment of a logic flow 800. The logic flow 800 may be representative of some or all of the operations executed by one or more embodiments described herein. For example, the logic flow 800 may include some or all of the operations to use the contactless card 101 to provide secure authentication for calls in a call center system. Embodiments are not limited in this context.

As shown, at block 810, the call center application 126 of the server 120 receives a phone call from a client device. At block 815, the call center application 126 of the server 120 determines that the phone number is associated with one or more accounts in the account database 124. At block 820, the call center application 126 of the server 120 connects the call to an agent. The agent may be associated with an agent system 140 executing an instance of the call center application 126. The agent may specify to generate a URL with session ID at block 820 using the call center application 126. At block 825, the call center application 126 of the server 120 and/or the agent system 140 generates a session ID, e.g., a hash value, and includes the session ID as a parameter in a URL, e.g., the URL 108. At block 830, the call center application 126 associates the session ID with a time limit, the account, the call, and/or the agent in the account data 124.

At block 830, the call center application 126 of the server 120 transmits the URL with session ID 108 to a known contact record associated with the account. For example, the call center application 126 of the server 120 may identify a mobile phone number in the account data 124 for the account and transmit the URL 108 via an SMS message to the phone number. As another example, the call center application 126 of the server 120 may identify an email address associated with the account in the account data 124 and transmit the URL 108 in an email directed to the email address. At block 835, the web server 127 receives an HTTP request from the web browser 115 of a device 110 specifying the URL generated at block 825.

At block 840, the web server 127 and/or the call center application 126 of the server 120 determines that the session ID in the URL received at block 835 matches the session ID stored in the account data at block 830. The call center application 126 of the server 120 and/or the web server 127 may further determine that an amount of time that has elapsed since the generation of the session ID at block 825 and the receipt of the request at block 835 does not exceed the time threshold associated with the session ID. At block 845, the web server 127 transmits a web page 134 associated with the URL 108 to the requesting device 110. The web server 127 may transmit a request to authenticate the call via the web page 134 in the web browser 115 at block 850. Doing so may generally instruct the user to tap the contactless card 101 to the device 110. However, in some embodiments, the request is included in or with the web page transmitted at block 845.

At block 855, the web page 134 and/or web browser 115 reads a cryptogram generated by the contactless card 101. At block 860, the web server 127 receives the cryptogram from the web page 134 and/or web browser 115. The cryptogram may include an indication specifying the cryptogram was read by the web page 134 and/or web browser 115 from the contactless card 101. At block 865, the web server 127 and/or the call center application 126 of the server 120 determines that an amount of time that has elapsed since the generation of the session ID at block 825 and the receipt of the cryptogram at block 860 does not exceed the time threshold associated with the session ID.

At block 870, the authentication application 123 decrypts the cryptogram by based on a diversified key 106 generated based on the master key 105 and counter value 104 for the card 101. At block 880, the web server 127, call center application 126 of the server 120, and/or the authentication application 123 may authenticate the account for the call received at block 805 based on the decryption of the cryptogram, the session ID in the URL 108 matching the stored session ID, and that the session ID has not expired. At block 885, the GUI of the call center application 126 of the agent system 140 may receive one or more attributes of the authenticated account and display the attributes in the GUI based on the authentication at block 880.

Figure 9:
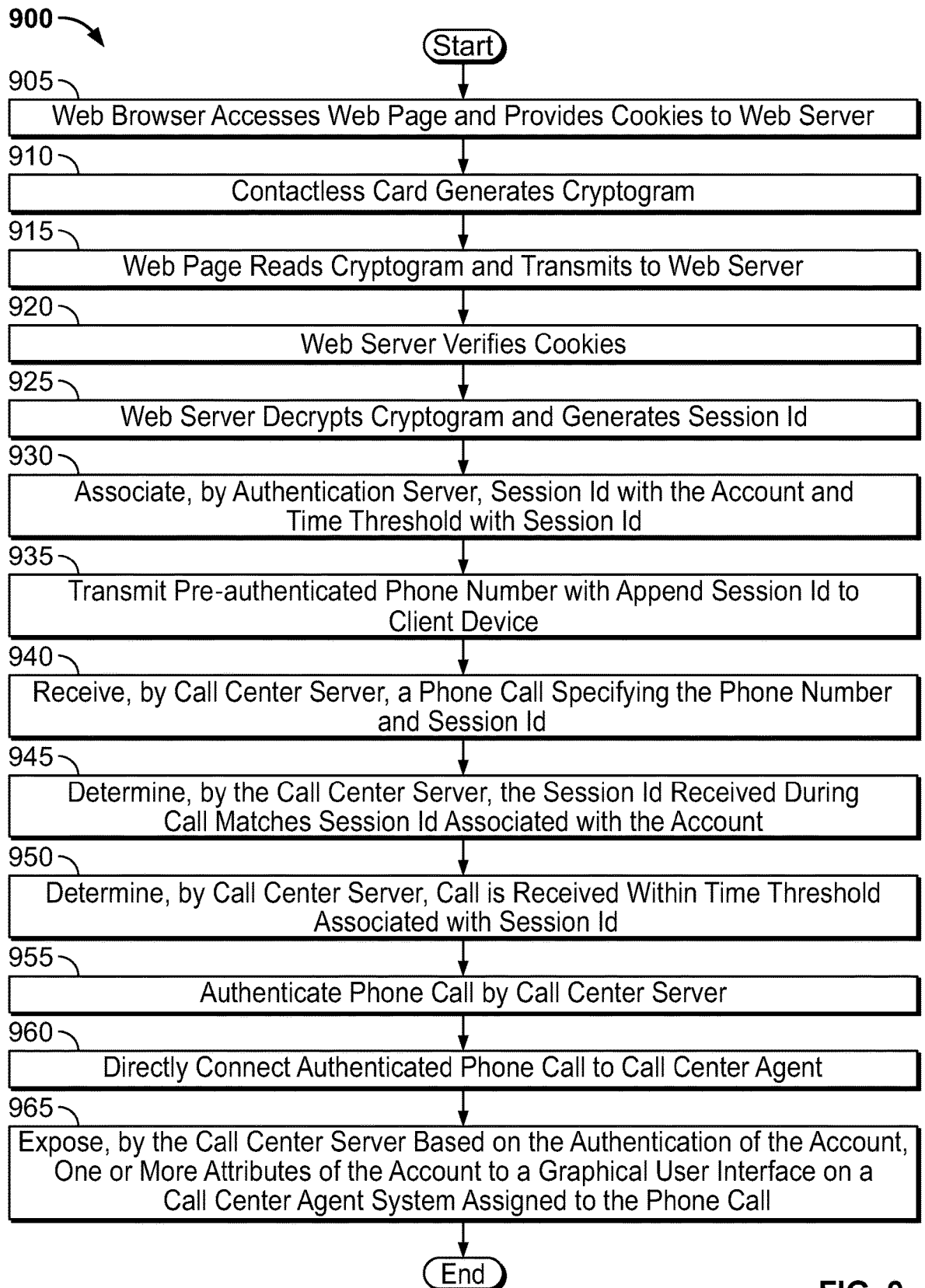
FIG. 9 illustrates a second logic flow.

FIG. 9 illustrates an embodiment of a logic flow 900. The logic flow 900 may be representative of some or all of the operations executed by one or more embodiments described herein. For example, the logic flow 900 may include some or all of the operations to pre-authenticate a call using the contactless card 101. Embodiments are not limited in this context.

In block 905, a web browser 115 of a device 110 accesses a web page 134 hosted by the web server 127. The web browser 115 may include one or more browser cookies 203 in an HTTP request to access the web page 134. Generally, the web page 134 accessed by the web browser 115 instructs the user to tap the contactless card 101 to initiate a pre-authenticated call. At block 910, the user taps the contactless card 101 to the device 110. The web page 134 and/or the web browser 115 may then instruct the contactless card 101 to generate a cryptogram. The contactless card 101 may then generate a data package comprising the cryptogram and an unencrypted customer identifier. At block 915, the web page 134 and/or web browser 115 reads the data package generated by the contactless card 101, e.g., via NFC. The web page 134 and/or web browser 115 may then transmit the data package to the server 120 with an indication specifying that the data package was read from the contactless card 101. As stated, the unencrypted customer identifier may comprise the customer ID 107 of the account or any other unique identifier that allows the server 120 to identify the relevant account, counter value 104, and/or master key 105 in the account data 124.

At block 920, the web server 127 verifies the cookies 203 received from the web browser 115. For example, the web server 127 may determine whether a valid hash value is stored in the cookies 203. At block 925, the web server 127 and/or the authentication application 123 decrypts the cryptogram based on the verification of the cookies 203. Generally, the web server 127 and/or authentication application 123 may identify the master key 105 and current counter value 104 in the account data 124 using the unencrypted customer ID 107 included in the data package with the cryptogram. The web server 127 and/or authentication application 123 may then increment the counter value and encrypt the master key 105 and incremented counter value 104 to generate a diversified key 106. The generated diversified key 106 may be used to attempt to decrypt the cryptogram. If the decryption is successful, the call center application 126 of the server 120, web server 127, and/or authentication application 123 generates a session ID. At block 930, the session ID generated at block 925 is associated with the account in the account data 124 and is assigned a time threshold. At block 935, the web server 127 transmits a pre-authenticated phone number including the session ID to the web browser 115. Doing so causes the web browser 115 to display the phone number. When the user selects the phone number, the phone application 113 may be opened, which initiates a call to the selected number.

At block 940, the call center application 126 of the server 120 receives a phone call specifying the pre-authenticated phone number from the client device 110. The client device 110 may further provide the session ID as input after some predetermined delay. The call center application 126 of the server 120 may generally confirm that the phone call is received on a pre-authenticated phone number. At block 945, the call center application 126 of the server 120 determines that the session ID provided as input during the call matches the session ID stored in the account data 124. At block 950, the call center application 126 of the server 120 determines that the call is received within the time threshold assigned to the session ID. At block 955, the call center application 126 of the server 120 authenticates the call based on the decryption of the cryptogram, the determination that the phone number is received on a pre-authenticated number, that the session ID received as input matches the stored session ID, and that the time threshold assigned to the session ID has not expired. At block 960, the call center application 126 of the server 120 directly connects the call to an agent. At block 965, the GUI of the call center application 126 of an agent system 140 may receive one or more attributes of the authenticated account and display the attributes in the GUI based on the authentication at block 955.

Figure 10:
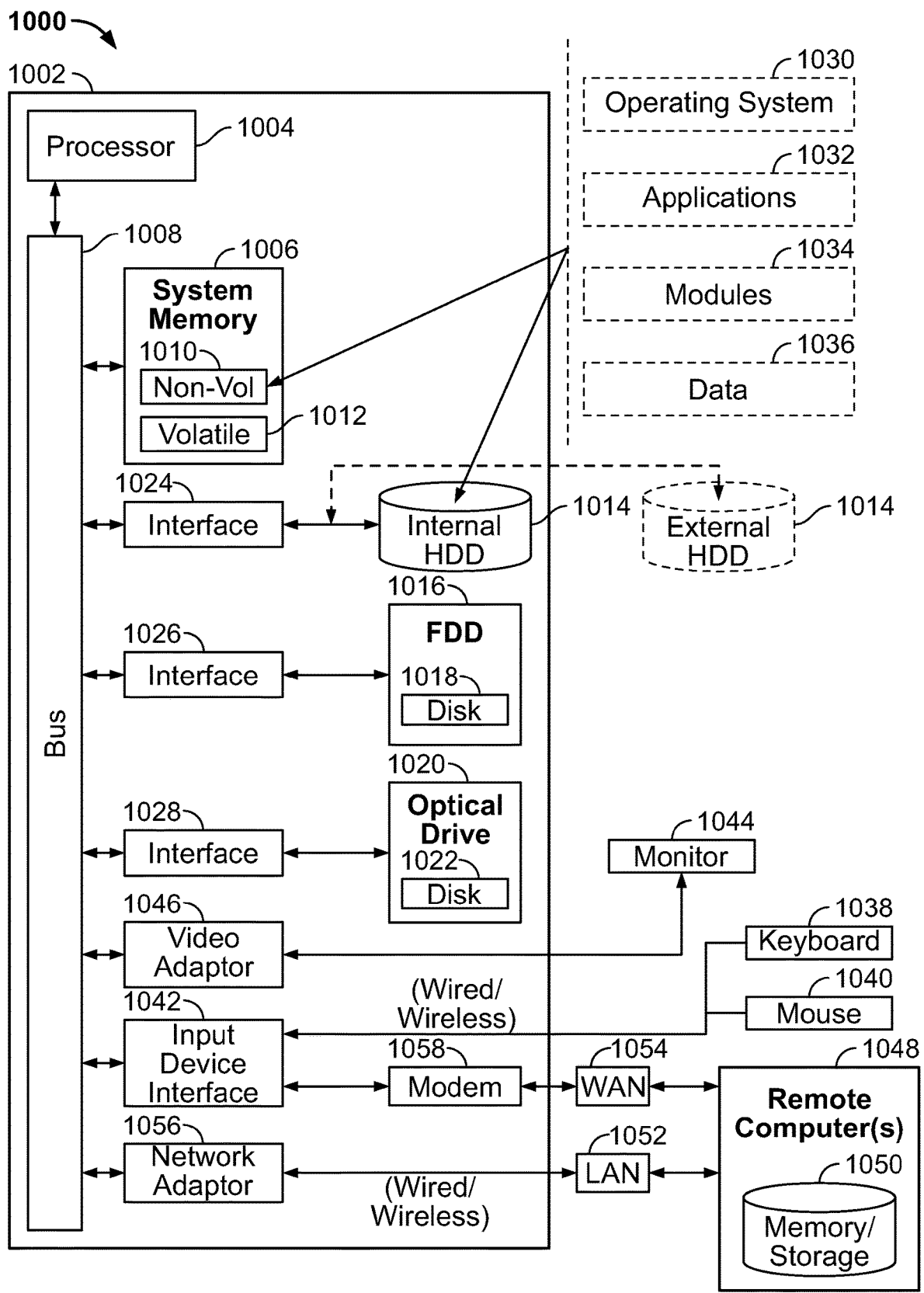
FIG. 10 illustrates a computer architecture in accordance with one embodiment.

FIG. 10 illustrates an embodiment of an exemplary computer architecture 1000 comprising a computing system 1002 that may be suitable for implementing various embodiments as previously described. In one embodiment, the computer architecture 1000 may include or be implemented as part of computing systems 100 or 200. In some embodiments, computing system 1002 may be representative, for example, of the contactless card 101, computing devices 110, server 120, and agent devices 140 of the systems 100-200. The embodiments are not limited in this context. More generally, the computing architecture 1000 is configured to implement all logic, applications, systems, methods, apparatuses, and functionality described herein with reference to FIGS. 1A-9.

As used in this application, the terms "system" and "component" are intended to refer to a computer-related entity, either hardware, a combination of hardware and software, software, or software in execution, examples of which are provided by the exemplary computing computer architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 includes a processor 1012, a system memory 1004 and a system bus 1006. The processor 1012 can be any of various commercially available processors.

The system bus 1006 provides an interface for system components including, but not limited to, the system memory 1004 to the processor 1012. The system bus 1006 can be any of several types of bus structure that may further interconnect to a memory bus (with or without a memory controller), a peripheral bus, and a local bus using any of a variety of commercially available bus architectures. Interface adapters may connect to the system bus 1008 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile 1010 and/or volatile 1012 memory. A basic input/output system (BIOS) can be stored in the non-volatile memory 110.

The computer 1002 may include various types of computer-readable storage media in the form of one or more lower speed memory units, including an internal (or external) hard disk drive 1030, a magnetic disk drive 1016 to read from or write to a removable magnetic disk 1020, and an optical disk drive 1028 to read from or write to a removable optical disk 1032 (e.g., a CD-ROM or DVD). The hard disk drive 1030, magnetic disk drive 1016 and optical disk drive 1028 can be connected to system bus 1006 the by an HDD interface 1014, and FDD interface 1018 and an optical disk drive interface 1034, respectively. The HDD interface 1014 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1010, and volatile 1012, including an operating system 1022, one or more applications 1042, other program modules 1024, and program data 1026. In one embodiment, the one or more applications 1042, other program modules 1024, and program data 1026 can include, for example, the various applications and/or components of the systems 100-200, such as the applet 103, counter 104, master key 105, diversified key 106, customer ID 107, phone application 113, web browser 115, URL 108, cryptogram 148, cryptogram 201, cookies 203, authentication application 123, account data 124, call center application 126, web server 127, and web pages 134.

A user can enter commands and information into the computer 1002 through one or more wire/wireless input devices, for example, a keyboard 1050 and a pointing device, such as a mouse 1052. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1012 through an input device interface 1036 that is coupled to the system bus 1006 but can be connected by other interfaces such as a parallel port, IEEE 1394 serial port, a game port, a USB port, an IR interface, and so forth.

A monitor 1044 or other type of display device is also connected to the system bus 1006 via an interface, such as a video adapter 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all the elements described relative to the computer 1002, although, for purposes of brevity, only a memory and/or storage device 1058 is illustrated. The logical connections depicted include wire/wireless connectivity to a local area network 1056 and/or larger networks, for example, a wide area network 1054. Such LAN and WAN networking environments are commonplace in offices and companies, and facilitate enterprise-wide computer networks, such as intranets, all of which may connect to a global communications network, for example, the Internet.

When used in a local area network 1056 networking environment, the computer 1002 is connected to the local area network 1056 through a wire and/or wireless communication network interface or network adapter 1038. The network adapter 1038 can facilitate wire and/or wireless communications to the local area network 1056, which may also include a wireless access point disposed thereon for communicating with the wireless functionality of the network adapter 1038.

When used in a wide area network 1054 networking environment, the computer 1002 can include a modem 1040, or is connected to a communications server on the wide area network 1054 or has other means for establishing communications over the wide area network 1054, such as by way of the Internet. The modem 1040, which can be internal or external and a wire and/or wireless device, connects to the system bus 1006 via the input device interface 1036. In a networked environment, program modules depicted relative to the computer 1002, or portions thereof, can be stored in the remote memory and/or storage device 1058. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1A-10 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
   receiving, by a server, a phone call from a client device;
   generating, by the server, a uniform resource locator (URL) comprising a session identifier as a parameter;
   associating, by the server, the session identifier with an account;
   transmitting, by the server, the URL to the client device;
   receiving, by the server from a web browser of the client device, a request comprising the URL and a cookie comprising a hash value;
   comparing, by the server, the session identifier of the URL of the request to the session identifier associated with the account;
   comparing, by the server, the hash value of the cookie to a hash value associated with the account;
   determining, by the server based on the comparisons, that the session identifier of the URL of the request matches the session identifier associated with the account and the hash value matches the hash value associated with the account;
   transmitting, by the server to the web browser, a web page associated with the URL;
   receiving, by the server from the web page in the web browser, a cryptogram read by the web page via a card reader of the client device;
   decrypting, by the server based on the determination that the hash value of the cookie matches the hash value associated with the account, the cryptogram;
   authenticating, by the server based on the decryption of the cryptogram and the determination that the session identifier of the URL matches the session identifier associated with the account, the account for the phone call; and
   providing, by the server based on the authentication of the account, one or more attributes of the account to a graphical user interface displayed on an agent system assigned to the phone call.

2. The method of claim 1, further comprising prior to receiving the cryptogram:
   transmitting, by the server to the web page in the web browser, a request to authenticate the account for the phone call; and
   receiving, by the server from the web page in the web browser, authentication credentials for the account, the authentication credentials comprising biometric credentials or a login and password.

3. The method of claim 1, further comprising prior to authenticating the account for the phone call:
   receiving, by the server from the web page in the web browser, an indication specifying that the cryptogram was read from a contactless card via the card reader of the client device.

4. The method of claim 1, wherein the URL is transmitted to a phone number associated with the account in an account database, the method further comprising:
   determining, by the server, that the phone call is received from the phone number associated with the account in the account database; and
   determining, by the server, that an amount of time the phone number has been associated with the account exceeds a threshold amount of time.

5. The method of claim 1, further comprising:
   assigning, by the server, a time threshold to the session identifier; and
   determining, by the server, that an elapsed amount of time between the generation of the session identifier and the receiving of the request comprising the URL does not exceed the time threshold.

6. The method of claim 1, wherein the cryptogram comprises a near-field communications (NFC) Forum Data Exchange Format (NDEF) tag.

7. The method of claim 1, further comprising:
   incrementing, by the server, a counter value associated with the account;
   generating, by the server, a diversified key based on the counter value and a master key associated with the account; and
   decrypting the cryptogram using the diversified key.

8. A system, comprising:
   a processor; and
   a memory storing instructions which when executed by the processor, cause the processor to:
      receive, by a server, a phone call from a client device;
      generate, by the server, a uniform resource locator (URL) comprising a session identifier as a parameter;
      associate, by the server, the session identifier with an account;
      transmit, by the server, the URL to the client device;
      receive, by the server from a web browser of the client device, a request comprising the URL and a cookie comprising a hash value;
      compare, by the server, the session identifier of the URL of the request to the session identifier associated with the account;
      compare, by the server, the hash value of the cookie to a hash value associated with the account;
      determine, by the server based on the comparisons, that the session identifier of the URL of the request matches the session identifier associated with the account and the hash value matches the hash value associated with the account;
      transmit, by the server to the web browser, a web page associated with the URL;
      receive, by the server from the web page in the web browser, a cryptogram read by the web page via a card reader of the client device;
      decrypt, by the server based on the determination that the hash value of the cookie matches the hash value associated with the account, the cryptogram;
      authenticate, by the server based on the decryption of the cryptogram and the session identifier of the URL matching the session identifier associated with the account, the account for the phone call; and
      provide, by the server based on the authentication of the account, one or more attributes of the account to a graphical user interface displayed on an agent system assigned to the phone call.

9. The system of claim 8, the memory storing instructions which when executed by the processor, cause the processor to:

transmit, by the server to the web page in the web browser, a request to authenticate the account for the phone call; and receive, by the server from the web page in the web browser, authentication credentials for the account, the authentication credentials comprising biometric credentials or a login and password.

10. The system of claim 8, the memory storing instructions which when executed by the processor, cause the processor to:

receive, by the server from the web page in the web browser, an indication specifying that the cryptogram was read from a contactless card via the card reader of the client device.

11. The system of claim 8, the memory storing instructions which when executed by the processor, cause the processor to:

determine, by the server, that the phone call is received from a phone number associated with the account in an account database, wherein the URL is transmitted to the phone number associated with the account in the account database; and determine, by the server, that an amount of time the phone number has been associated with the account exceeds a threshold amount of time.

12. The system of claim 8, the memory storing instructions which when executed by the processor, cause the processor to:

assign, by the server, a time threshold to the session identifier; and determine, by the server, that an elapsed amount of time between the generation of the session identifier and the receiving of the request comprising the URL does not exceed the time threshold.

13. The system of claim 8, wherein the cryptogram comprises a near-field communications (NFC) Forum Data Exchange Format (NDEF) tag.

14. The system of claim 8, the memory storing instructions which when executed by the processor, cause the processor to:

increment, by the server, a counter value associated with the account;

generate, by the server, a diversified key based on the counter value and a master key associated with the account; and decrypt the cryptogram using the diversified key.

15. A non-transitory computer-readable storage medium storing instructions that when executed by a processor cause the processor to:

receive, by a server, a phone call from a client device;

generate, by the server, a uniform resource locator (URL) comprising a session identifier as a parameter;

associate, by the server, the session identifier with an account;

transmit, by the server, the URL to the client device;

receive, by the server from a web browser of the client device, a request comprising the URL and a cookie comprising a hash value;

compare, by the server, the session identifier of the URL of the request to the session identifier associated with the account;

compare, by the server, the hash value of the cookie to a hash value associated with the account;

determine, by the server based on the comparisons, that the session identifier of the URL of the request matches the session identifier associated with the account and the hash value matches the hash value associated with the account;

transmit, by the server to the web browser, a web page associated with the URL;

receive, by the server from the web page in the web browser, a cryptogram read by the web page via a card reader of the client device;

decrypt, by the server based on the determination that the hash value of the cookie matches the hash value associated with the account, the cryptogram;

authenticate, by the server based on the decryption of the cryptogram and the session identifier of the URL matching the session identifier associated with the account, the account for the phone call; and provide, by the server based on the authentication of the account, one or more attributes of the account to a graphical user interface displayed on an agent system assigned to the phone call.

16. The computer-readable storage medium of claim 15, storing instructions that when executed by the processor cause the processor to:

transmit, by the server to the web page in the web browser, a request to authenticate the account for the phone call; and receive, by the server from the web page in the web browser, authentication credentials for the account, the authentication credentials comprising biometric credentials or a login and password.

17. The computer-readable storage medium of claim 15, storing instructions that when executed by the processor cause the processor to:

receive, by the server from the web page in the web browser, an indication specifying that the cryptogram was read from a contactless card via the card reader of the client device.

18. The computer-readable storage medium of claim 15, storing instructions that when executed by the processor cause the processor to:

determine, by the server, that the phone call is received from a phone number associated with the account in an account database, wherein the URL is transmitted to the phone number associated with the account in the account database; and determine, by the server, that an amount of time the phone number has been associated with the account exceeds a threshold amount of time.

19. The computer-readable storage medium of claim 15, storing instructions that when executed by the processor cause the processor to:

assign, by the server, a time threshold to the session identifier; and determine, by the server, that an elapsed amount of time between the generation of the session identifier and the receiving of the request comprising the URL does not exceed the time threshold.

20. The computer-readable storage medium of claim 15, storing instructions that when executed by the processor cause the processor to:

increment, by the server, a counter value associated with the account;

generate, by the server, a diversified key based on the counter value and a master key associated with the account; and decrypt the cryptogram using the diversified key, wherein the cryptogram comprises a near-field communications (NFC) Forum Data Exchange Format (NDEF) tag.

* * * * *